United States Patent [19]

Lamb et al.

[11] 4,354,252

[45] Oct. 12, 1982

[54] PROGRAMMABLE DIGITAL DATA TERMINAL FOR MOBILE RADIO TRANSCEIVERS

[75] Inventors: James A. Lamb, Hoffman Estates; Johnny E. Blankenship, Schaumburg; George E. Dykas, Vernon Hills; William Milleker, Chicago; Kenneth W. Hamilton, Rolling Meadows, all of Ill.

[73] Assignee: Motorola, Inc., Schaumburg, Ill.

[21] Appl. No.: 230,828

[22] Filed: Feb. 2, 1981

Related U.S. Application Data

[63] Continuation of Ser. No. 837,255, Sep. 27, 1977, abandoned.

[51] Int. Cl.³ ............................................. G06F 15/40
[52] U.S. Cl. .................................. 364/900; 364/409; 364/424; 375/7; 455/11; 455/31; 455/73; 455/89; 340/825.3; 340/825.54
[58] Field of Search ... 364/200 MS File, 900 MS File, 364/409, 424; 375/7, 8; 455/11, 31, 38, 89, 73-78, 158; 179/2 DP, 2 EB, 1 VE, 5 R; 370/104

[56] References Cited

U.S. PATENT DOCUMENTS

| | | | |
|---|---|---|---|
| 3,550,001 | 12/1970 | Hanley | 325/15 |
| 3,568,161 | 3/1971 | Knickel | 364/900 |
| 3,626,295 | 12/1971 | Sabrui | 325/58 X |
| 3,651,471 | 3/1972 | Haselwood et al. | 364/900 |
| 3,760,375 | 9/1973 | Irwin et al. | 364/200 |
| 3,822,363 | 7/1974 | Moyer et al. | 340/152 R X |
| 3,899,772 | 8/1975 | Mead et al. | 340/152 R |
| 3,936,807 | 2/1976 | Edwards | 364/900 |
| 3,956,615 | 5/1976 | Anderson et al. | 340/152 R X |
| 3,956,739 | 5/1976 | Ophir et al. | 364/900 |
| 3,956,740 | 5/1976 | Jones et al. | 364/900 |
| 3,962,644 | 6/1976 | Baker | 325/470 |
| 3,973,244 | 8/1976 | Lovercheck et al. | 364/200 |
| 3,976,840 | 8/1976 | Cleveland et al. | 179/2 DP |
| 3,983,492 | 9/1976 | Fisher et al. | 325/468 |
| 4,005,388 | 1/1977 | Morley et al. | 364/900 |
| 4,027,243 | 5/1977 | Stackhouse et al. | 325/58 X |
| 4,037,202 | 7/1977 | Terzian | 364/900 |
| 4,092,594 | 5/1978 | Baker | 325/25 X |
| 4,122,304 | 10/1978 | Mallien | 364/900 X |
| 4,147,984 | 4/1979 | Caudel et al. | 325/64 X |

FOREIGN PATENT DOCUMENTS

1324616 7/1973 United Kingdom .

OTHER PUBLICATIONS

"Vehicle Locator to be Used in Police Patrol Cars", in *Computer Design*, Aug. 1971, p. 26.
McGlynn, *Micro Processors*, John Wiley & Sons, 1976, pp. 162, 181-183.

*Primary Examiner*—Archie E. Williams, Jr.
*Attorney, Agent, or Firm*—Rolland R. Hackbart; Sang Ki Lee; James W. Gillman

[57] ABSTRACT

In a data transmission system, for communicating messages between a base station and a plurality of mobile stations, each mobile station includes a radio frequency transceiver and a programmable data terminal for sending and receiving predeterminedly formatted digitally encoded messages. A keyboard subsystem and character display subsystem are controlled by a programmable microprocessor subsystem which also processes received and transmitted messages. A transmit and receive system clock interrupts the operation of the microcomputer to process messages. The messages include a cyclical redundant check byte as well as a control number byte. Characters which are not editable blink. A terminal status display line is provided and a message received character is also provided. The system sets the system clock period to be the same for all data rates. Automatic restart of the system is provided as well as a means for detecting and generating a pseudo-random message preamble. Cursor positioning, memory interchange, and display keys are provided. Receipt and acknowledgement of various types of messages are also provided.

17 Claims, 18 Drawing Figures

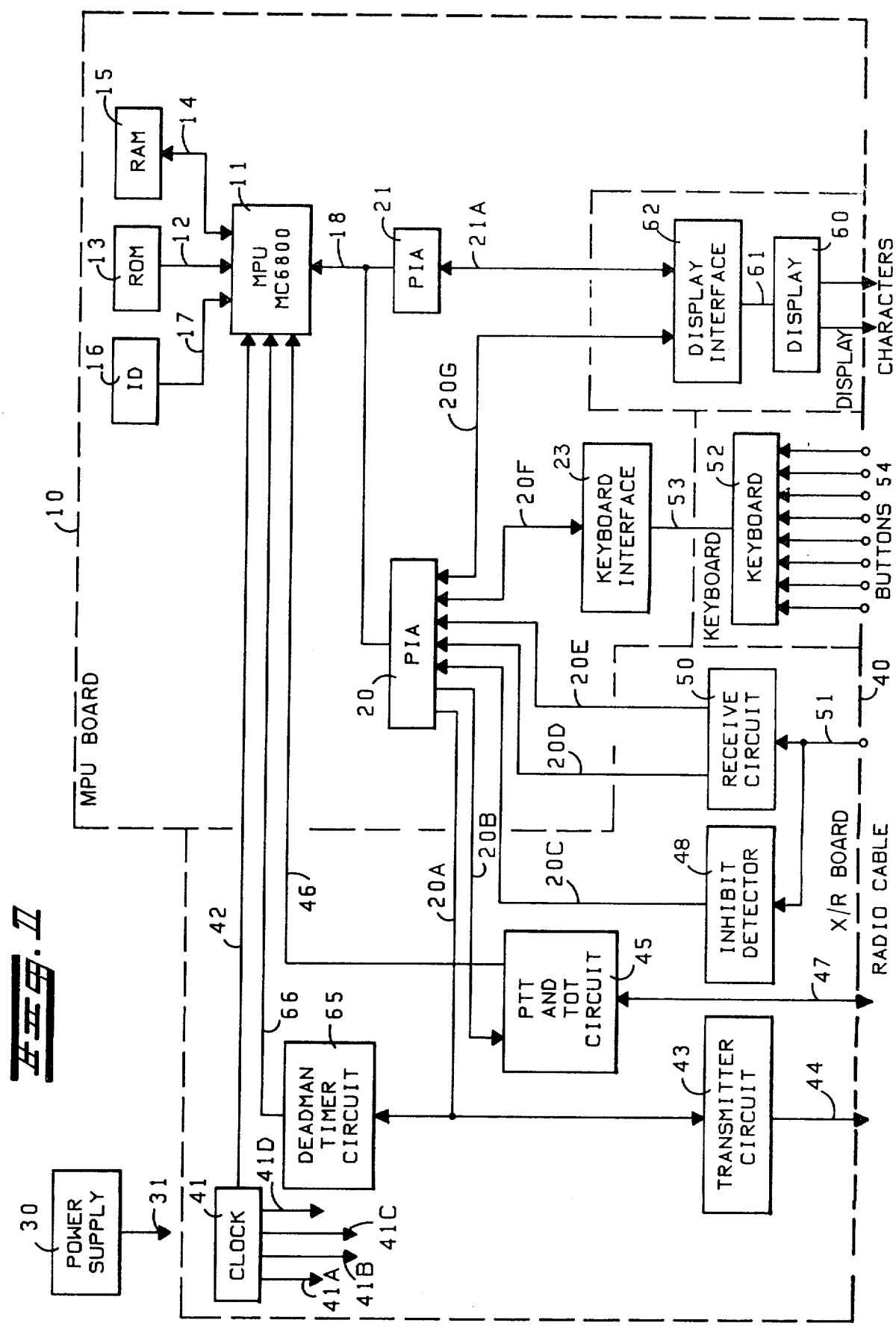

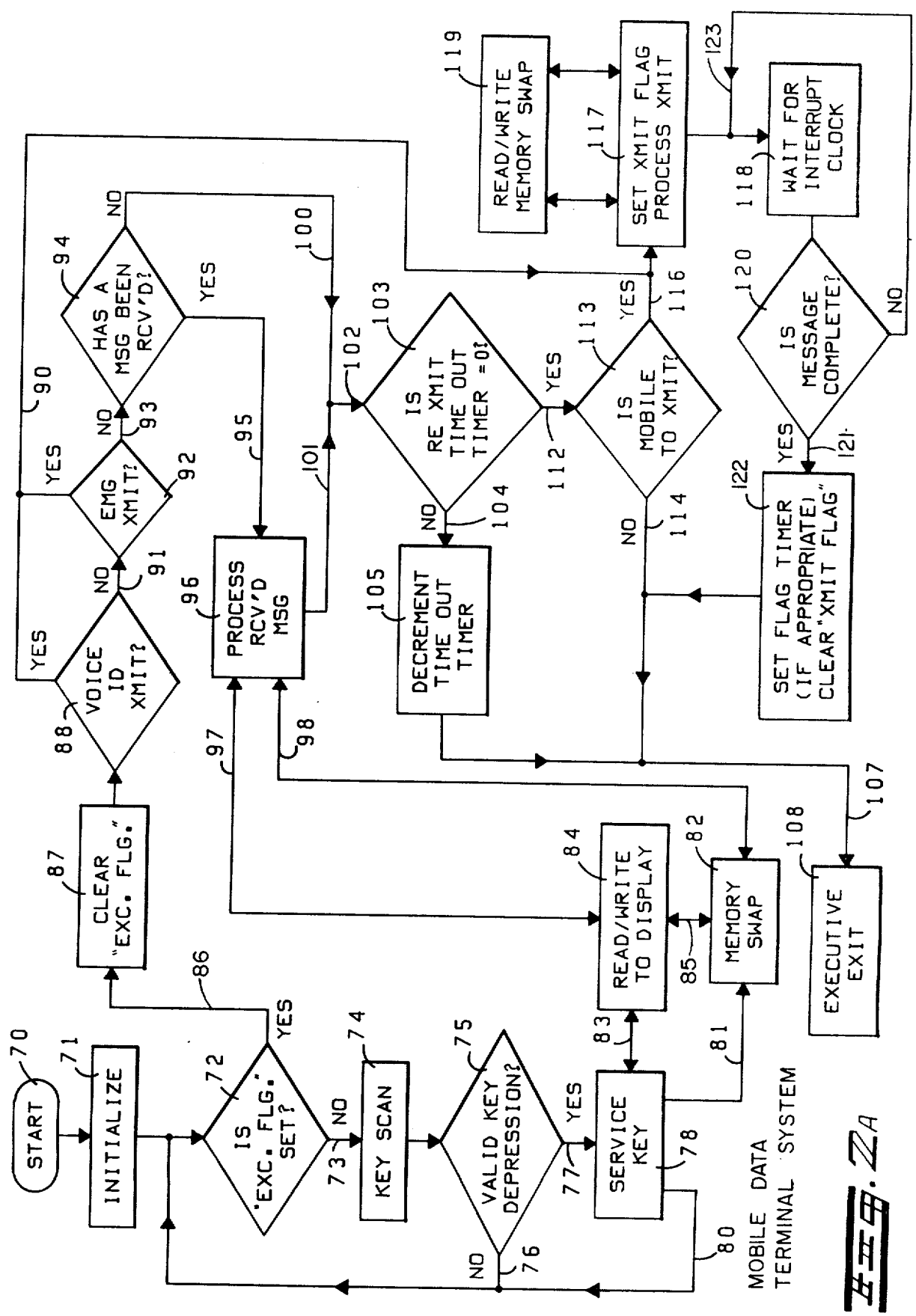

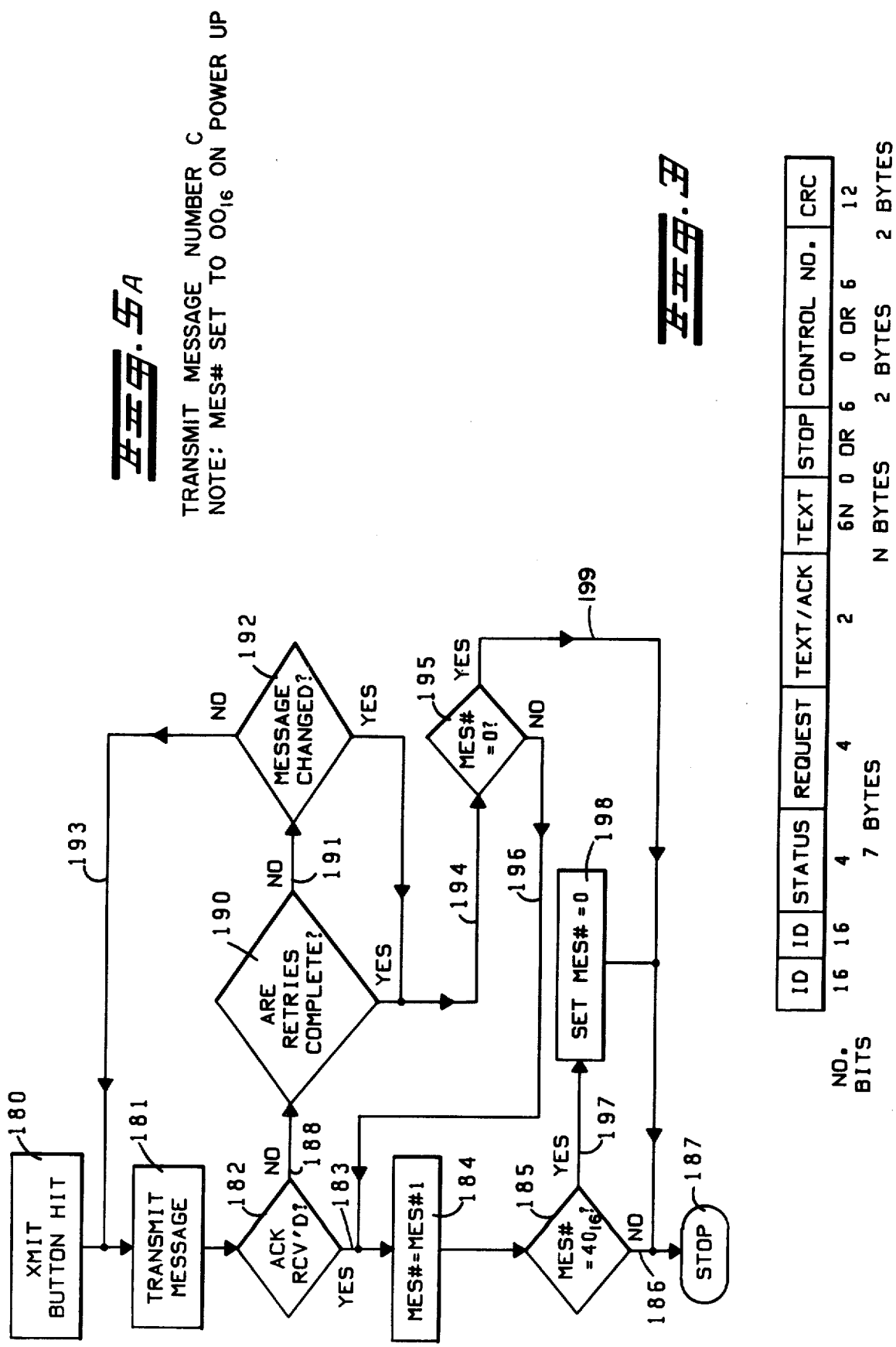

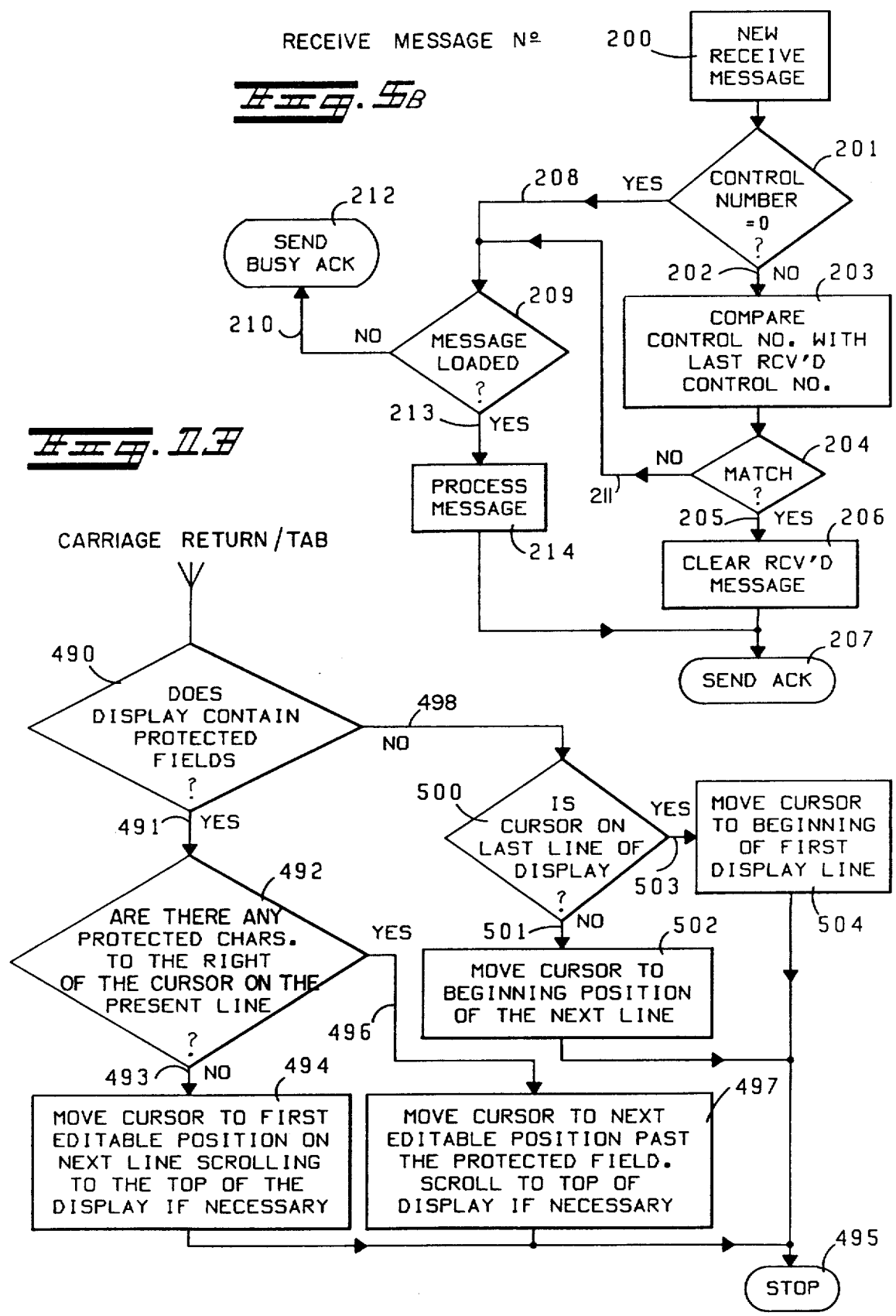

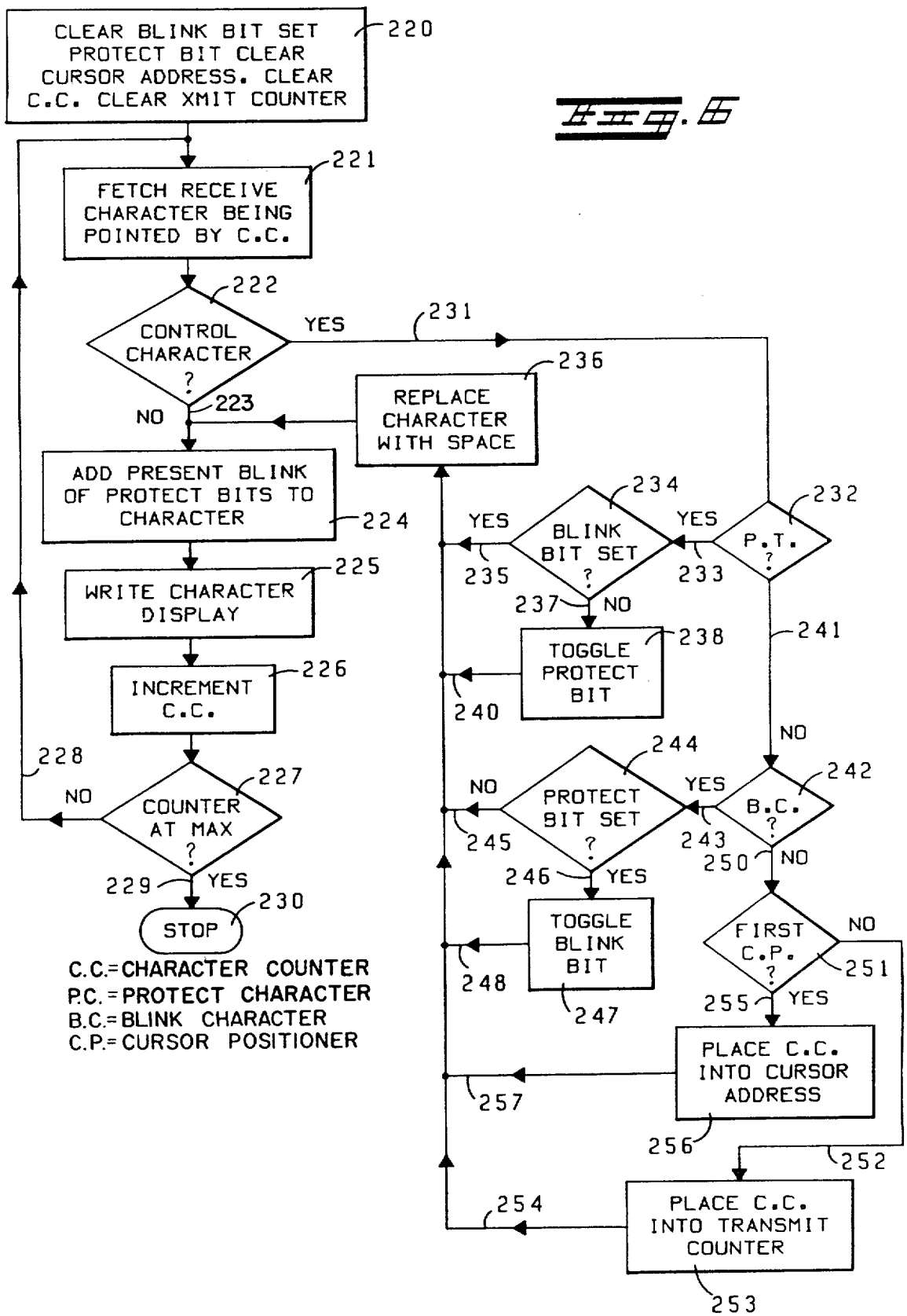

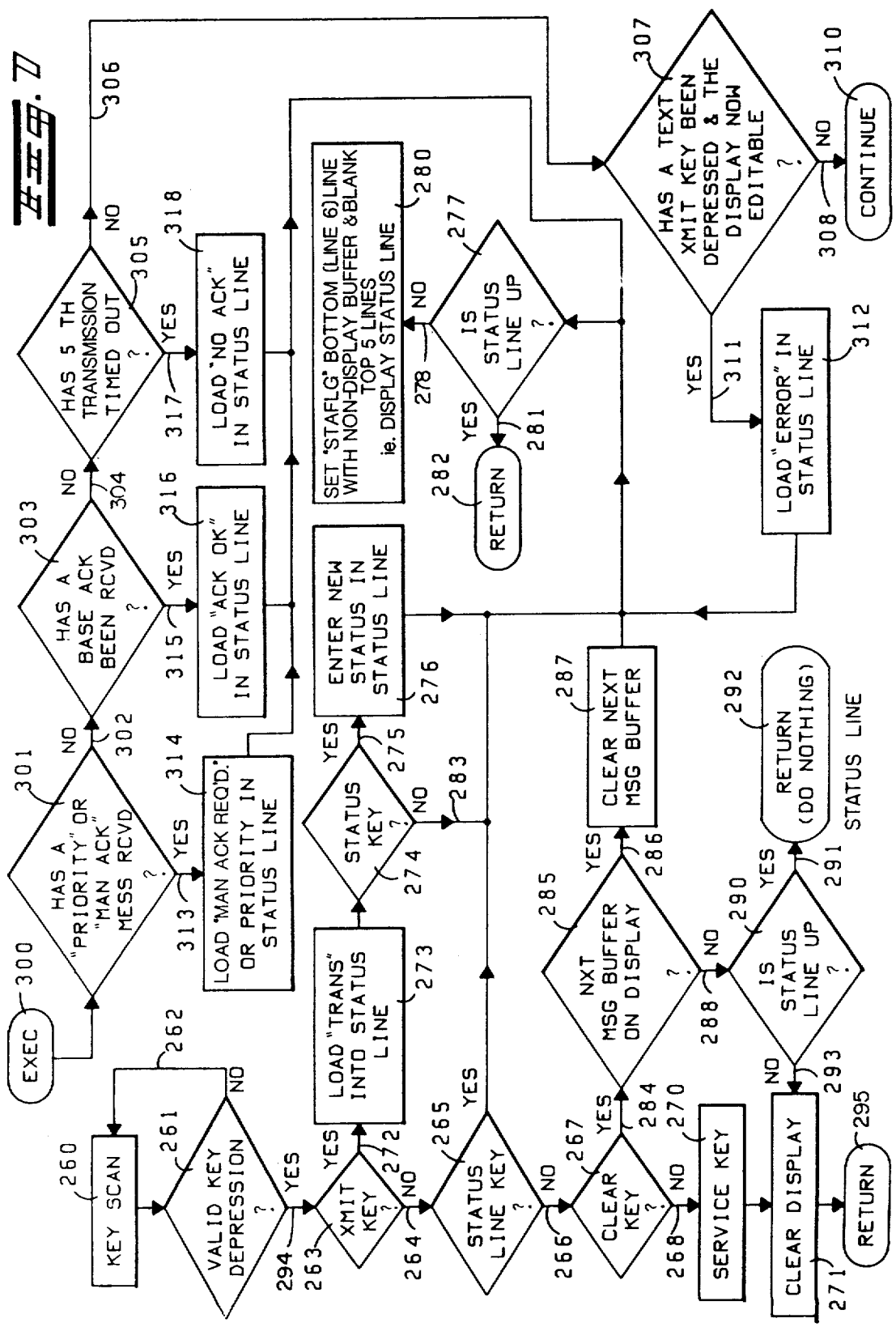

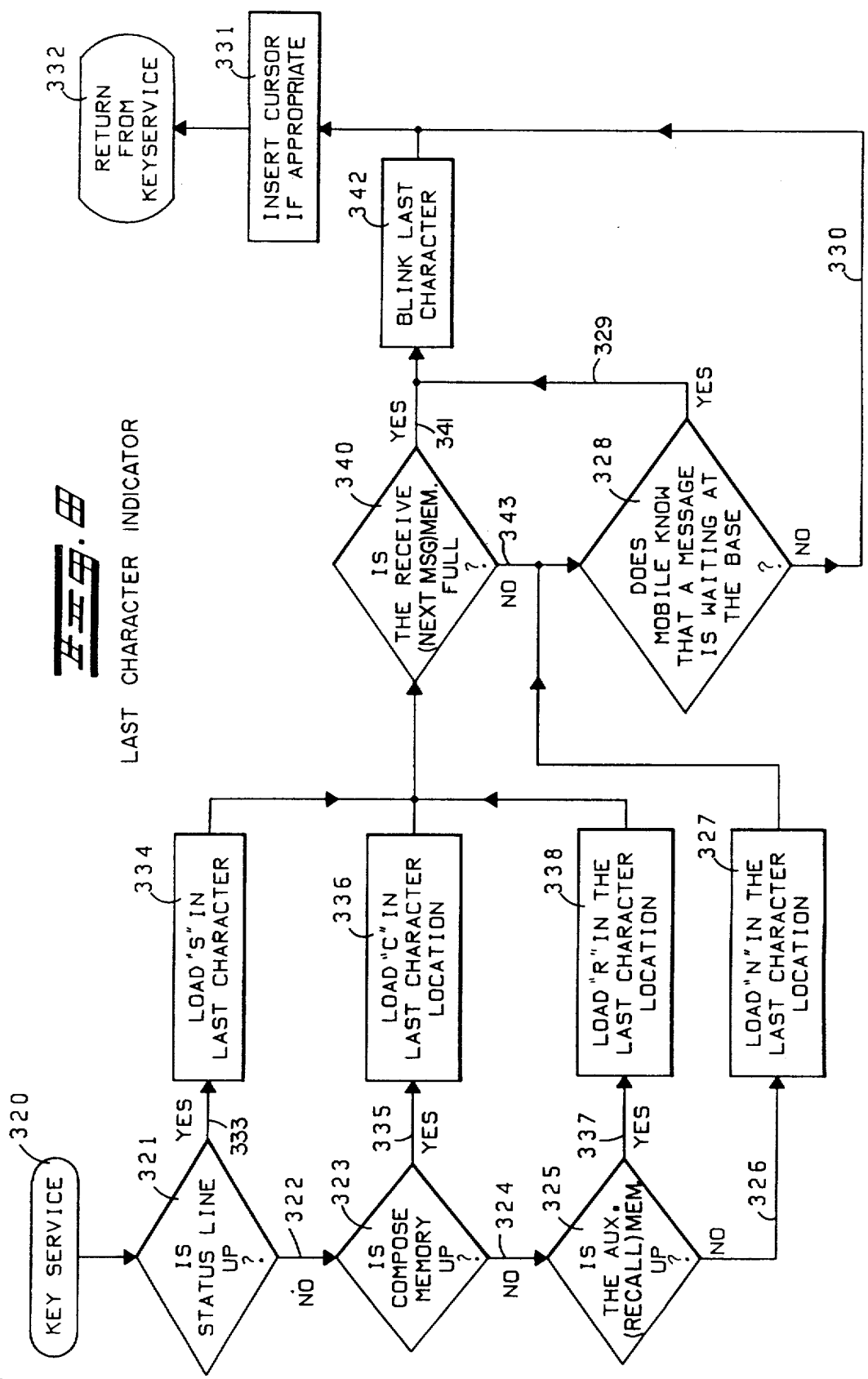
FIG. 8 LAST CHARACTER INDICATOR

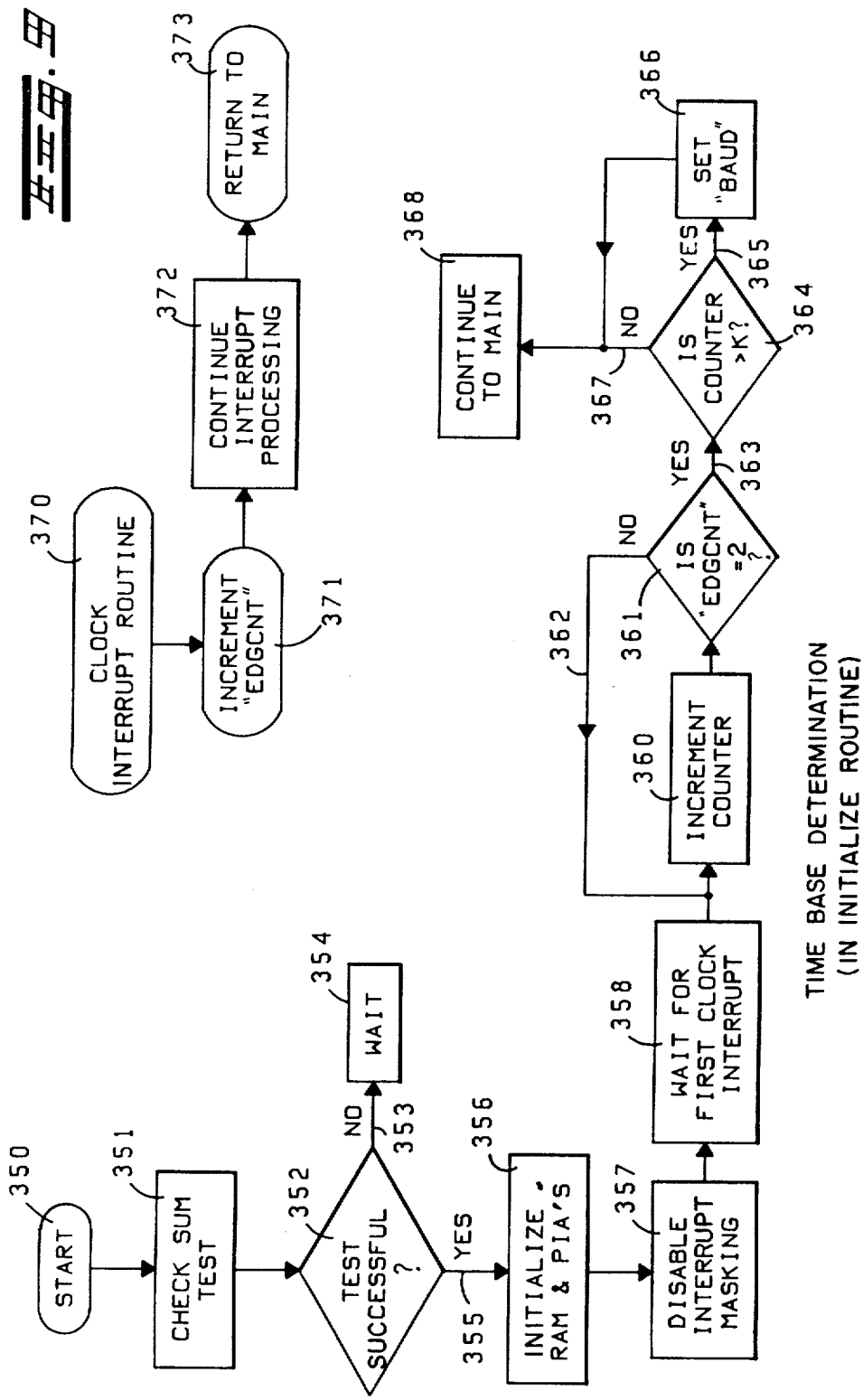

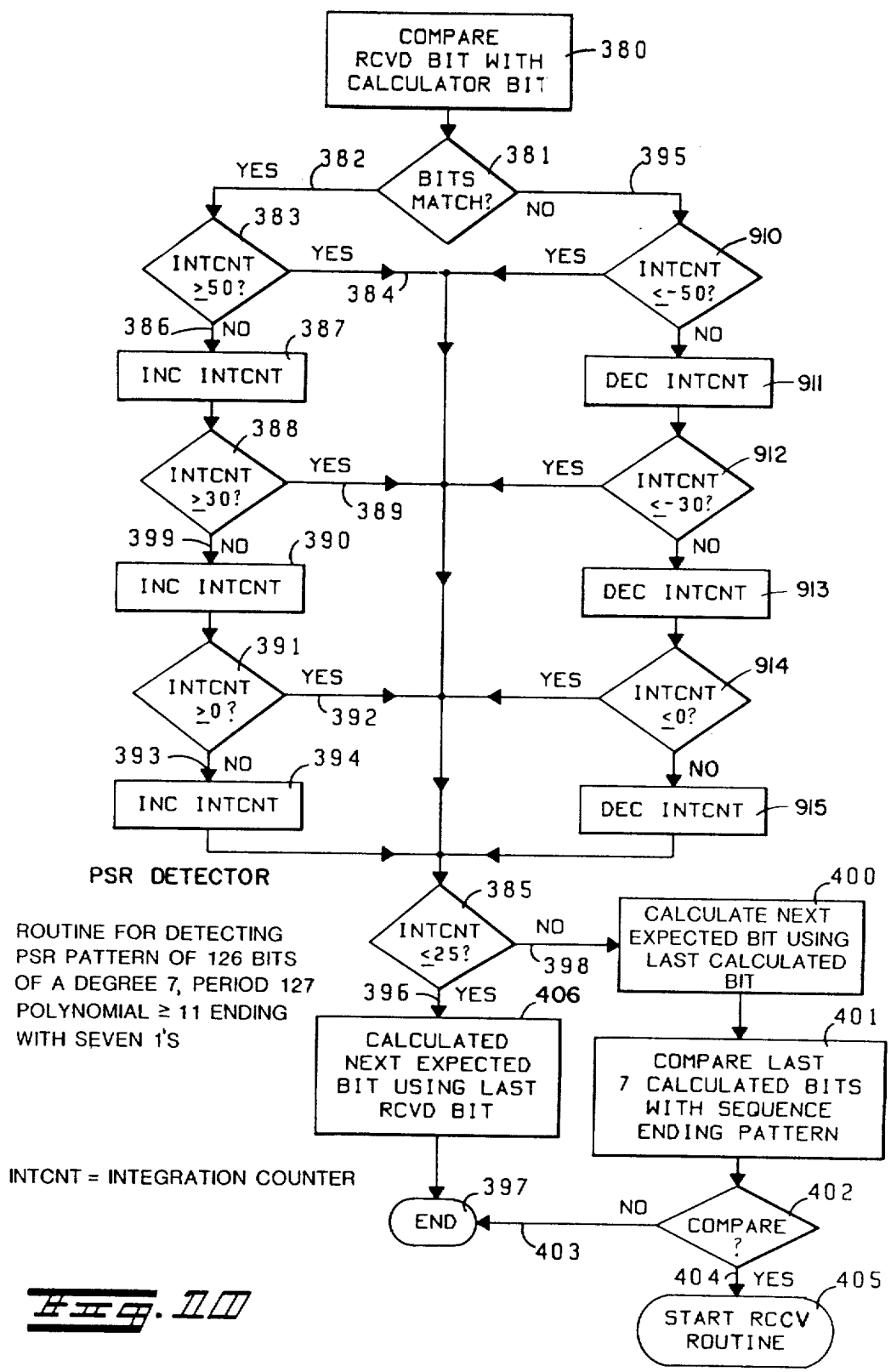

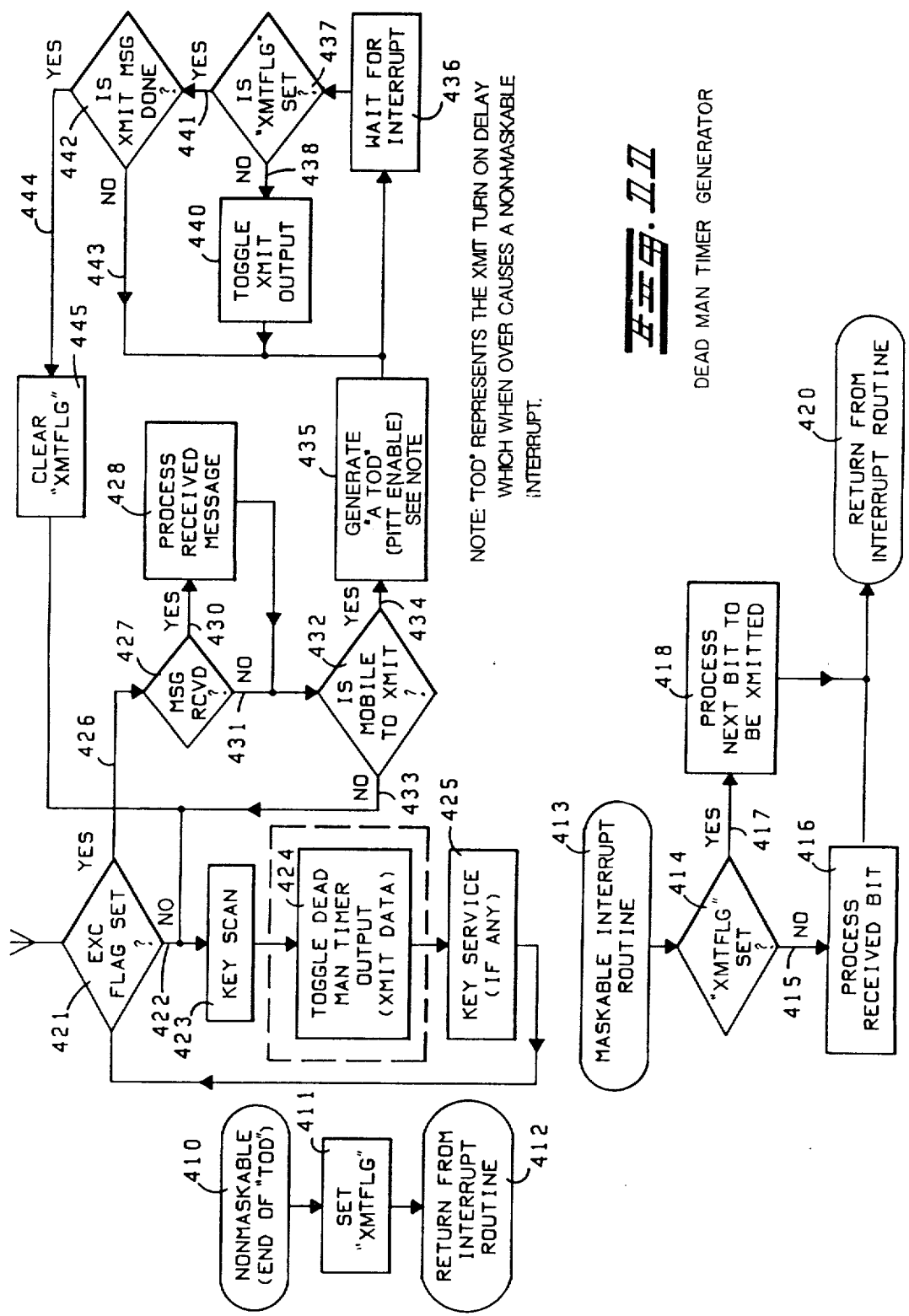
FIG. 11  DEAD MAN TIMER GENERATOR

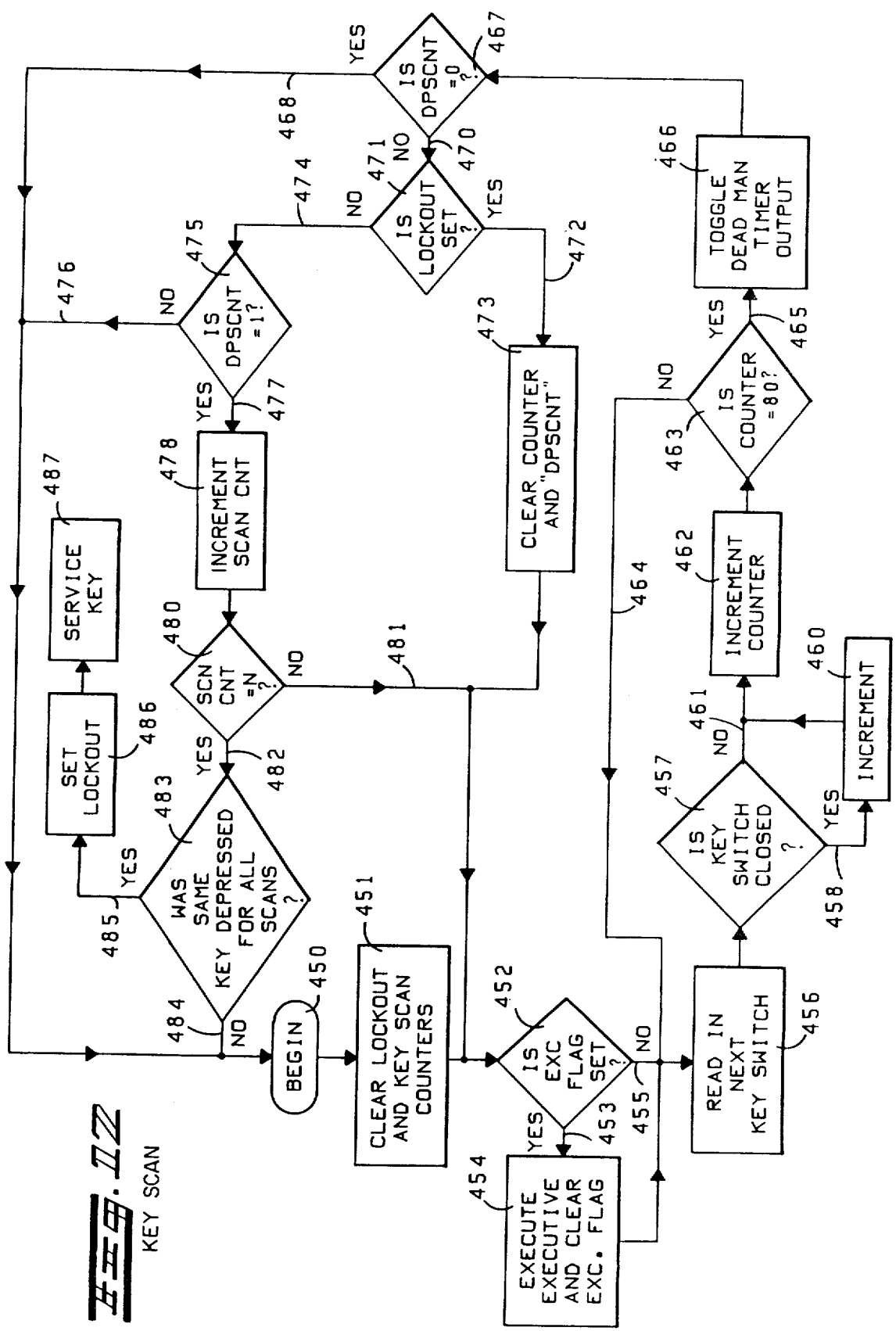
FIG. 12 KEY SCAN

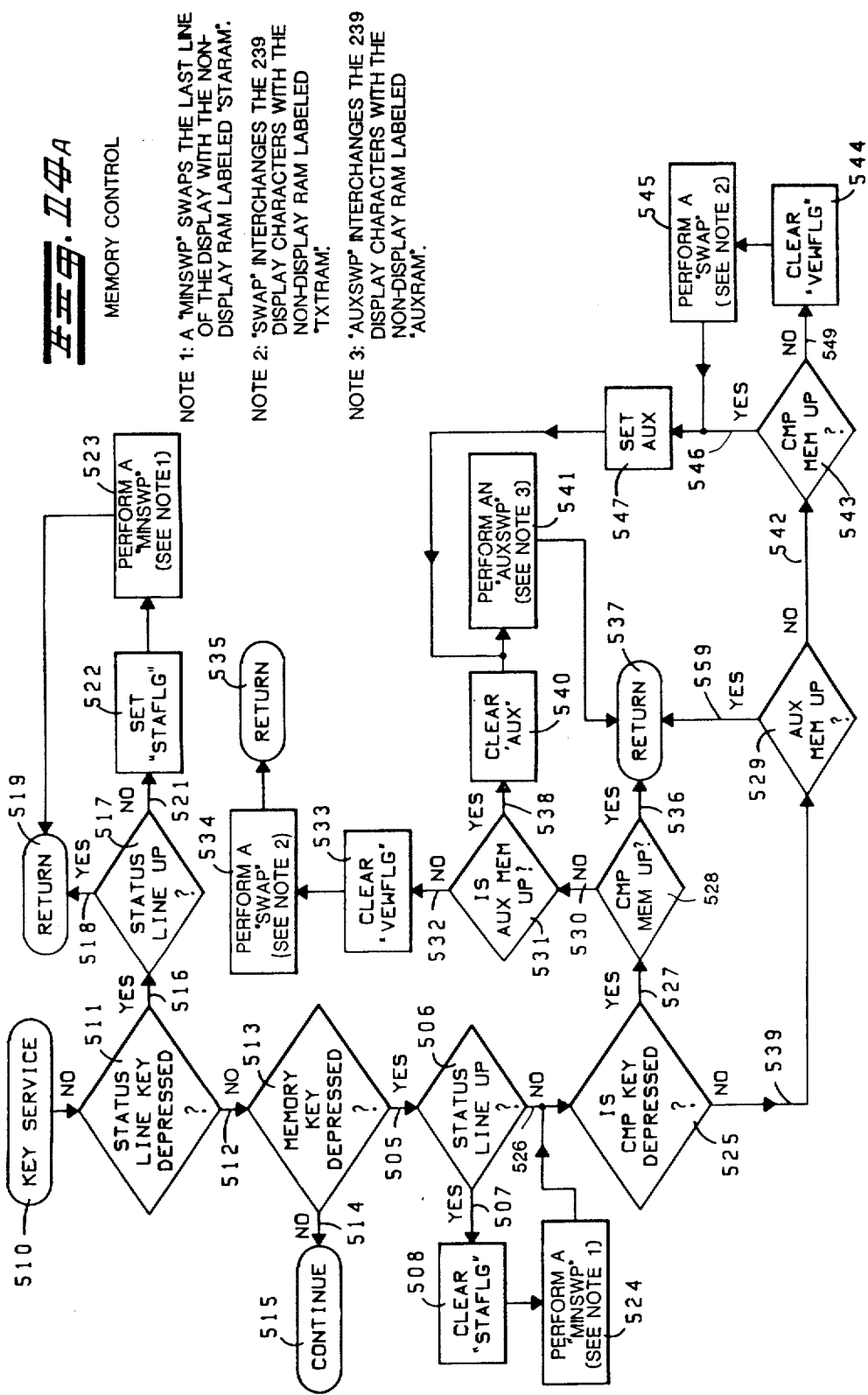

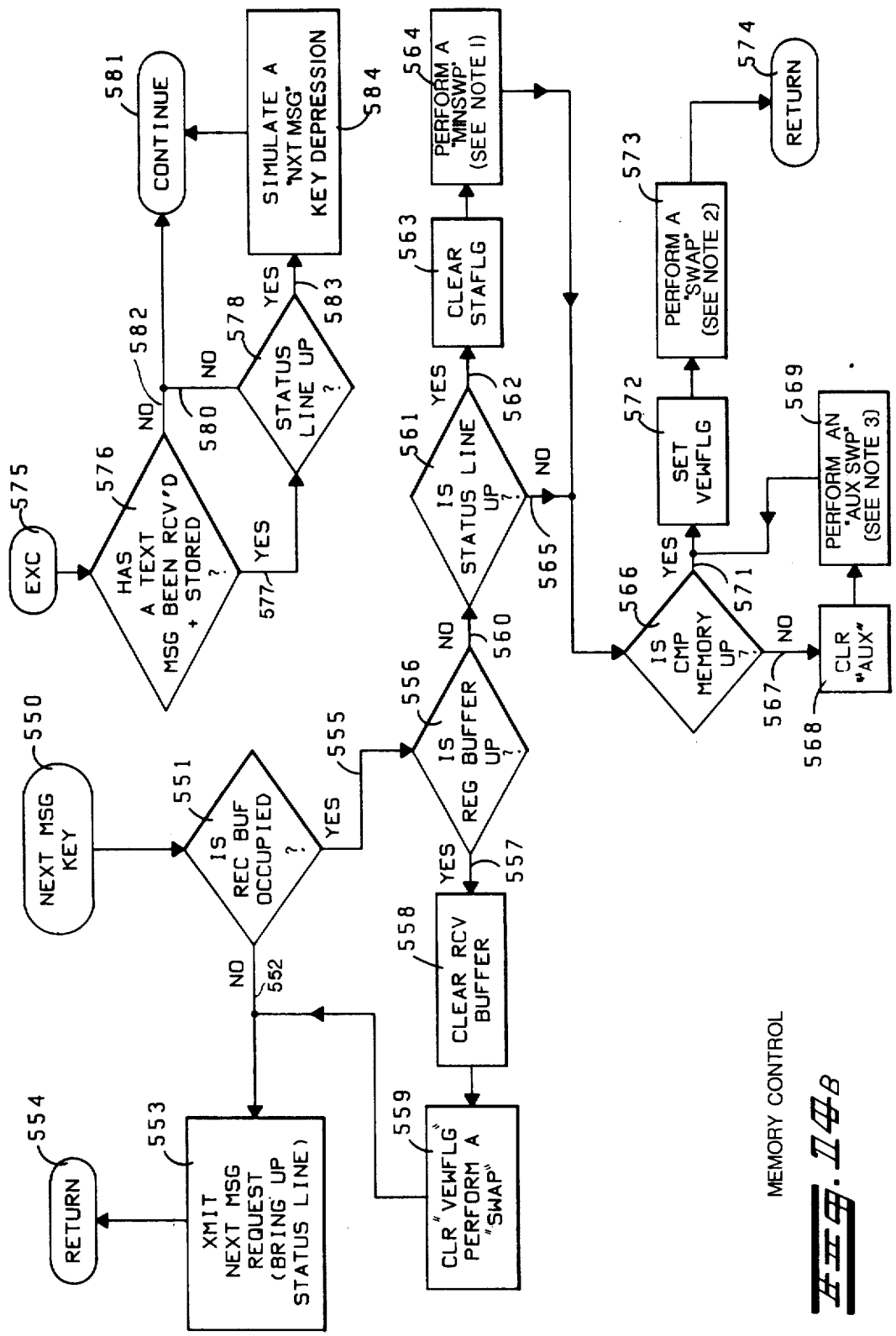
FIG. 14B  MEMORY CONTROL

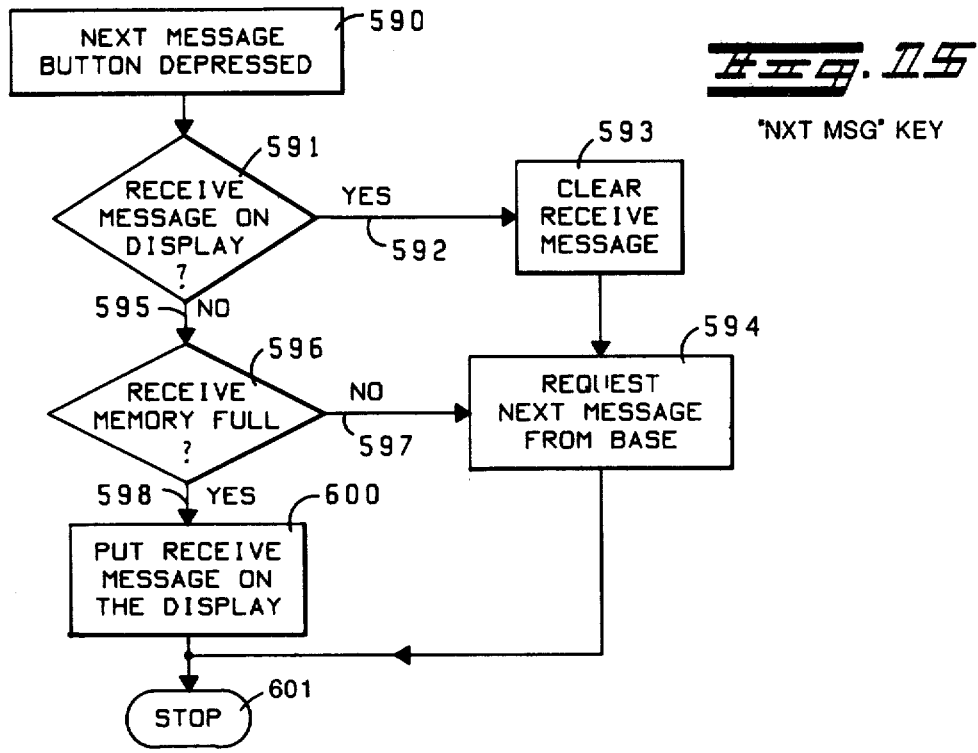
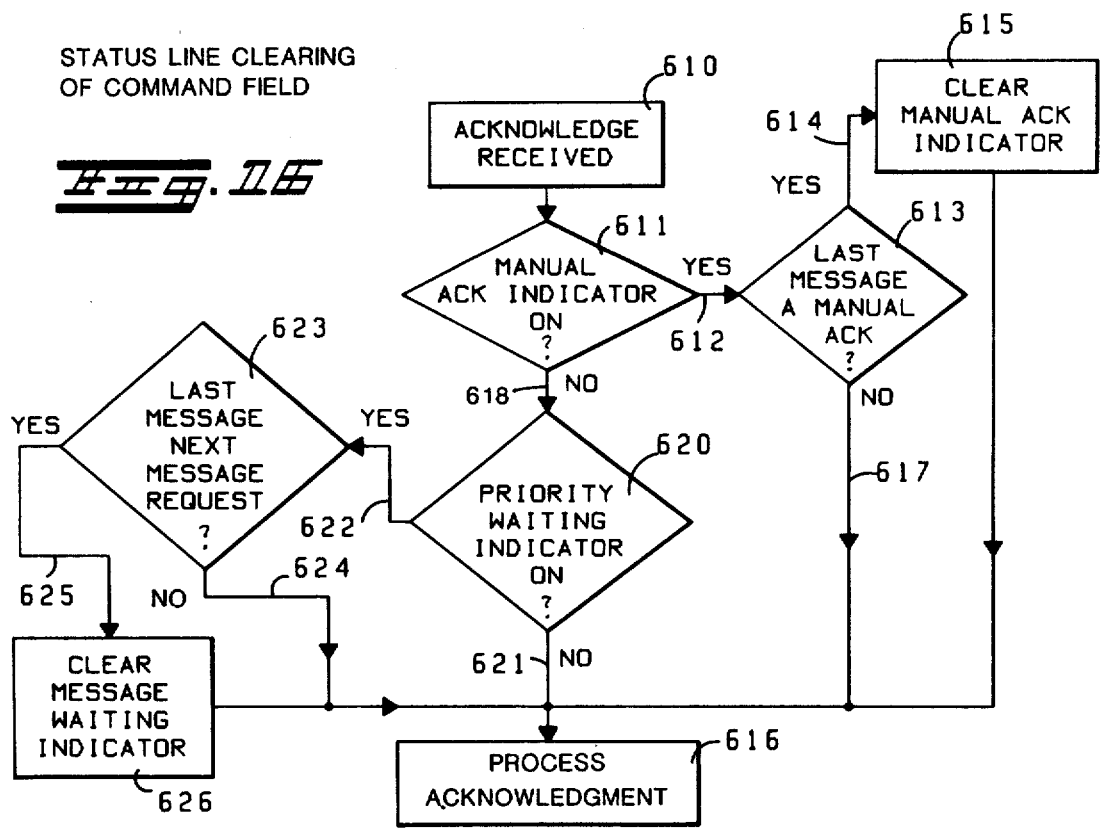

PROGRAMMABLE DIGITAL DATA TERMINAL FOR MOBILE RADIO TRANSCEIVERS

This is a continuation of application Ser. No. 837,255, filed Sept. 27, 1977 now abandoned.

BACKGROUND OF THE INVENTION

1. Field of the Invention

This invention relates generally to mobile data terminals. More particularly, this invention relates to programmable mobile data terminals for sending and receiving predeterminedly formatted digitally encoded messages.

2. Description of the Prior Art

Mobile data terminals of the prior art have typically been of the type which have circuitry dedicated to performing a particular function. These circuits included circuits for servicing and scanning keyboards, circuits for storing and displaying characters, circuits for receiving messages, and circuits for transmitting messages. Each of these circuits is independent of the other circuits. This results in complicated, less reliable, expensive terminals, not optimally suited for use in the crowded environment of, for example, a law enforcement officer's vehicle. Since these systems use dedicated, discrete circuit components to perform the separate electronic functions when called upon, as described above, much of the dedicated circuitry lies idle and, being inflexible in application, is not suitable for use in performing other system functions.

With the growth of computerized law enforcement information systems, data on, for example, stolen vehicles, wanted persons, license plates, and outstanding warrants is available at local law enforcement headquarters in computer-based systems, which are oftentimes linked to State and National data bases. Very often inquiries into these data bases by an officer in the field is by means of voice communication to his dispatcher. The need for an improved mobile electronic data terminal by which an officer can more effectively communicate directly with a data base through an electronic dispatching system has long existed.

SUMMARY OF THE INVENTION

It is, therefore, an object of this invention to provide an improved, programmable, data terminal system for sending and receiving predeterminedly formatted digitally encoded messages.

It is another object of this invention to provide a mobile data terminal having a keyboard subsystem and a character display system controlled by a programmable microcomputer subsystem.

It is another object of this invention to provide a mobile data terminal for processing received and transmitted messages under the control of a programmable microcomputer system.

It is another object of this invention to provide a mobile data terminal controlled by a programmable microcomputer subsystem, the system having a priority interrupt to process received and transmitted message data bits, the priority interrupt being generated by a system clock.

Accordingly, an improved, programmable mobile data terminal system for sending and receiving predeterminedly formatted and digitally encoded messages is provided having an interface subsystem for sending and receiving encoded messages, a keyboard subsystem, a character display subsystem, and a programmable microcomputer subsystem for controlling keyboard and display subsystems and for processing received and transmitted message data bits. The programmable microcomputer system is sequentially controlled and is designed to be interrupted to process received and transmitted message data bits in response to a transmit and receive system clock. A cyclical redundant check byte and a control number byte are provided as part of the formatted digitally encoded message. Certain characters may be protected from being edited and are designated according to one aspect of this invention. According to another aspect of the invention, the terminal operational status is alternatively provided on a portion of the character display. Identification of displayed messages and the status of messages not displayed are provided by a character position dedicated thereto. The period of the transmit and receive system clock is fixed at the same value for all system data rates. Means for detecting the presence of a pseudo-random preamble are provided as well as means for restarting the computer subsystem in response to a system malfunction. Cursor positioning means as well as means for controlling the alternative display of the contents of various system memories as well as messages received but not displayed or waiting but not displayed are provided. Means for acknowledging the receipt of messages and for sending emergency messages are also provided. A keyboard scan routine for identifying a key closure is also disclosed.

BRIEF DESCRIPTION OF THE DRAWINGS

For a more complete understanding of the invention, reference is made to the drawings in which:

FIG. 1 is a block diagram of the major elements of a microcomputer controlled mobile data terminal system according to the invention;

FIGS. 2A and 2B are flowcharts of a microcomputer controlled data terminal according to the invention;

FIG. 3 is a representation of the format of a message used by a system according to the invention;

FIG. 5a is a flowchart of a transmit message control number routine according to the invention;

FIG. 5b is a flow diagram of a receive control message number routine according to the invention;

FIG. 6 is a flowchart for the edit toggle and blink toggle processing and control routine and the cursor positioning and character field location routine;

FIG. 7 is a flowchart for displaying the data terminal status line according to the invention;

FIG. 8 is a flowchart for the data terminal memory display indication routine;

FIG. 9 is a flowchart for the data terminal time base determination according to the invention;

FIG. 10 is a flowchart for the pseudo-random detection routine according to the invention;

FIG. 11 is a flowchart of the data terminal microcomputer restart routine according to the invention;

FIG. 12 is a flowchart for the data terminal keyboard scan routine according to the invention;

FIG. 13 is a flowchart of the combined carriage return and tab function according to the invention;

FIGS. 14A and 14B are flowcharts of the data terminal memory control routine according to the invention;

FIG. 15 is a flowchart of the data terminal next message key routine;

FIG. 16 is a flowchart of the data terminal status line clearing routine.

DESCRIPTION OF THE PREFERRED EMBODIMENT

Figure 2B:
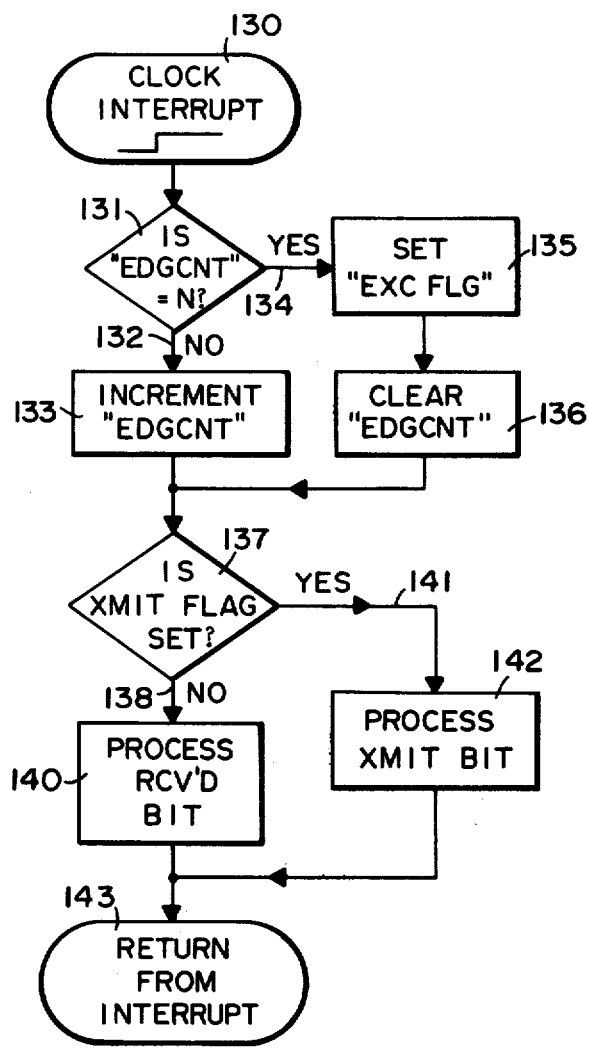

Referring to FIG. 1 of the drawing, a general system block diagram of the system according to the invention is shown. The essential ingredients of a system including mobile data terminals are described in U.S. Pat. Nos. 3,899,772, 3,906,445 and 3,980,924. Further prior art systems that may advantageously utilize the mobile data terminal of the present invention are described in U.S. Pat. Nos. 3,644,883 and 3,718,899. The mobile data terminal of the present invention may be located in mobile units such as police vehicles. Information, dispatched or requested from the base station, is automatically displayed by the mobile data terminal in the mobile unit. The embodiment of the mobile data terminal described herein includes circuit components which are mounted on various circuit boards, and the circuit elements contained within the dashed lines of FIG. 1 are entitled correspondingly for convenience. An MPU board 10, or the microprocessor unit board, has thereupon the conventional arrangement for a microcomputer, particularly those components associated with the Motorola MC6800 microprocessor family of components (see description of components in manual, "MC6800 Microcomputer System Design Data", published by Motorola, Inc., 1976 and see description of M6800 system programming in manuals, "M6800 Programming Reference Manual", published by Motorola, Inc., 1976, and "M6800 Microprocessor Programming Manual", published by Motorola, Inc., 1975.). Those components include an MPU MC6800 miroprocessor unit 11 (described in detail in U.S. Pat. No. 4,030,079) which is shown diagrammatically coupled by a multi-line connection 12 to a read only memory MC6830's (ROM) 13 which contains stored program steps for operation of the MPU unit 11. Also coupled to the MPU unit 11 by a bi-directional multi-line connection 14 is a random access memory MC6810's (RAM) 15 which is used for temporary storage of information by the MPU 11. Also contained on the MPU board is circuitry relating to identification of a particular terminal, designated ID 16, which is connected to the MPU by a connection line 17. Also connected to the MPU by a bi-directional multi-line connection 18 are two programmable interface adaptors MC6820's (described in detail in U.S. Pat. No. 3,979,730), PIA, 20, 21, also part of the Motorola MC6800 microprocessor family. These circuits are coupled to other circuits by signal lines 20a through 20g, and 21a, respectively. The PIA's couple signals either to or from the MPU 11. A keyboard interface circuit 23 is coupled to the PIA 20 by means of bi-directional signal lines 20f. A power supply circuit 30, as is known in the art, is provided for obtaining properly regulated voltage supplies for the system circuitry as symbolically shown by an output line 31.

The radio interface electronic subsystem circuit board designated as the X/R board (such as that described in U.S. Pat. No. 3,906,445), or the transmit/receive board, 40 has a clock source circuit 41 thereupon which provides appropriate outputs on a signal line 42 to the MPU 11 and other appropriate clock outputs on the signal lines 41a through 41d. A transmit circuit 43, as is known in the art (e.g. see transmit board circuitry in manual 68P81023E60, "MODAT Mobile Data Terminal", published by Motorol Service Publications Dept., Motorola, Inc., 1975), is coupled to the MPU 11 through the PIA 20 by means of signal line 20a and to the radio system through which the mobile data terminal communicates by means of a signal line 44. A push to talk and timeout timer circuit 45, as is known in the art (e.g. see transmit board circuitry of aforementioned manual 68P81023E60), is coupled to the MPU directly by a signal line 46 and indirectly through PIA 20 by a signal line 20b, as well as being coupled to the radio system by a signal line 47. An inhibit detector 48, such as a squelch detector or private-line tone detector, as is known in the art, for preventing one or more mobile units from transmitting simultaneously, and a receive circuit 50, as is known in the art (e.g. see receive board circuitry of aforementioned manual 68P81023E60), are coupled to the radio receiving equipment by a signal line 51. Both circuits are coupled to the MPU 11 by means of signal lines 20c, 20d, and 20e.

The keyboard interface circuit 23, as is known in the art (e.g. see U.S. Pat. No. 3,906,445 and keyboard interface board of aforementioned manual 68P81023E60), is coupled to the keyboard 52 by a multi-line signal connection 53 which has inputs from the pushbuttons designated 54.

Characters on a visual display 60, such as a Burroughs Corp. self scan alphanumeric display panel, as is known in the art (e.g. see bulletin no. 3502A, published by Burroughs Corp., July 1976), are provided by multi-line signal connection 61 from a display interface circuit 62, as is known in the art (e.g. see display interface board in aforementioned manual 68P81023E60), which is fed by the bi-directional multi-line signal connections 20g and 21a, through PIAs from the MPU 11.

On the X/R Board 40 is a deadman timer circuit 65, as is known in the art and also generally referred to as a "watchdog timer" (e.g. see the book "Design of Real-Time Computer Systems", by James Martin, published by Prentice Hall, Inc., 1967), which is periodically toggled by transitions on line 20a. If toggles are absent for an appropriate time period, the circuit 65 causes a restart signal to appear on line 66 coupled to the MPU 11. This prevents the microprocessor from operating indefinitely in an abnormal mode. For example, the deadman timer circuit 65 may be a missing pulse detector of the type described at page 723 of the "Signetics Analog Data Manual", published by Signetics Corp., 1977. Such a missing pulse detector changes the state of its output signal if a pulse is missing from a pulse train or does not occur within a predetermined time from the previous pulse. The input to the missing pulse detector may be coupled to line 20a from PIA 20 and the output of the missing pulse detector may be coupled to the restart input of MPU 11.

Thus, each of the blocks in FIG. 1 represents conventional circuitry, which when arranged and interconnected as shown in FIG. 1 can advantageously utilize the present invention. For example, exemplary circuitry for the blocks on MPU board 10 are: an MC6800 microprocessor for MPU 11, an MC6810 memory for RAM 15, MC6830 memories for ROM 13 and ID 16, MC6820 peripheral interface adapters for PIA's 20 and 21, and an MC6870 clock generator for use in clock 41. The interconnection of the blocks on MPU board 10 shown generally in FIG. 1 is illustrated in detail in the aforementioned MC6800 Microcomputer System Design Data Manual. The deadman timer ("watchdog timer") circuit 65 may be a conventional monostable multivibrator such as the Signetics NE555, arranged as a missing pulse detector for sensing the absence of transitions on line 20A and resetting MPU 11 by way of line 66. Exemplary circuitry for all of the remaining blocks of FIG. 1 are illustrated and described in the aforementioned Motorola Instruction Manual 68P81023E60. Since the circuitry of the MC6800 microprocessor family is electrically compatible with the circuitry in the 68P81023E60 manual (both have +5 V power supply voltage), interconnections from one to the other can be made directly without any additional interface circuitry. The display interface 62 is exemplified by the circuitry on DLN6282A interface board, where data latches U9 and U16 can be connected by lines 20G and 21A to PIA's 20 and 21. The keyboard interface 23 is exemplified by the circuitry on DLN1051A keyswitch board, where encoder U1 can be connected by lines 20F to PIA 20. Receive circuit 50 is exemplified by the circuitry on CLN 1052A receive board, where the demodulated data signal from flip-flop U53B and the data clock signal from U15B can be connected by lines 20D and 20E to PIA 20. Clock 41 is exemplified by the clock circuitry of DLN 1052A receive board, where divider U22A provides output signals for four different data rates. Inhibit detector 48 is exemplified by the circuitry on DLN6286A transmit board, where a transmitter inhibit signal provided by gate U5D may be connected by line 20C to PIA 20. The PTT and TOT circuit 45 is exemplified by the circuitry on DLN6286A transmit board, where a PTT signal provided by transistor Q12 can be connected by line 46 to MPU 11, and a signal on line 20B from PIA 20 can be connected to time-out timer (TOT) U46B for enabling the PTT signal on line 47 of the Radio Cable when a message is to be transmitted. Transmitter circuit 43 is exemplified by the circuitry on DLN6286A transmit board, where line 20A carrying the message bits can be connected to gate U53A for differential encoding and transmission by the transmit board circuitry. Thus, all blocks in FIG. 1 can be exemplified by conventional circuitry in the MC6800 microprocessor family and in the 68P81023E60 manual, where direct interconnections can be made thereamongst because they are electrically compatible. Furthermore, the exemplary circuitry referred to hereinabove need not be modified in order to practice the present invention.

The flowcharts of FIG. 2 and FIGS. 4 to 16 illustrate the inventive algorithms utilized in the operational program for the programmable mobile data terminal embodying the present invention. The operational program depicted in these flowcharts is particularly well adapted for use with the MC6800 microprocessor family of components described hereinabove, although any suitable conventional microcomputer may be utilized in practicing the present invention. These flowcharts constitute a complete and workable design of the operational program necessary to practice the inventive algorithms. These flowcharts have been reduced to practice on the MC6800 system. The operational program may be readily coded from these detailed flowcharts with the instructions of the MC6800, described in detail in the aforementioned "MC6800 Programming Reference Manual" and "MC6800 Microprocessor Programming Manual", or coded with the instructions of any other suitable conventional microcomputer. Once the flowcharts have been reduced to practice (i.e. debugged or checked out), the coding of the flowcharts becomes a mere mechanical step for one skilled in the art (see the book, "Computer Programming Fundamentals", by Herbert D. Leeds and Gerald W. Weinberg, published by McGraw-Hill, New York, 1961, for a detailed description of the programming process).

The operational program of the programmable mobile data terminal embodying the present invention includes a main routine illustrated by the flowchart of FIG. 2A and a clock interrupt routine illustrated by the flowchart of FIG. 2B. The flowcharts of FIGS. 4 to 16 illustrate subroutines which may be appropriately called from the main routine of FIG. 2A or clock interrupt routine of FIG. 2B. Thus, the main routine and clock interrupt routine generally illustrate the timing and execution of the operational program, and the detailed execution of the operational program is illustrated by the subroutines of FIGS. 4 to 16.

Referring to FIG. 2A, the main routine includes a key scan and service portion 72, 74, 75 and 78 and a executive portion entered at block 72. The operational program is normally scanning and servicing the keyboard and only enters the executive portion if EXCFLG is set. While in the main routine of FIG. 2A, a clock transition of the transmit and receive data clock produces an interrupt which results in a transfer of program control to the clock interrupt routine of FIG. 2B. Upon completion of the clock interrupt routine of FIG. 2B, program control returns again to the main routine of FIG. 2A. The subroutines of FIGS. 4 to 16 are called from the main routine or clock interrupt routine. Upon completion of the respective subroutine, program control returns to the main routine or clock interrupt routine. In the flowchart of FIG. 2A, the program starts at block 70 and proceeds to the initialize block 71 for system initialization. The program then continues to a decision block 72 where it is determined whether EXCFLG (executive flag) is set. As described hereinbelow, EXCFLG is set after a predetermined number of clock interrupts are received. If EXCFLG is not set, the program continues on the no decision path 73 to a key scan routine 74, the program then continuing to the decision block 75 where it is determined whether a valid key depression has been made. If no, the program continues on path 76 looping back to repeat. If the decision is yes, the program continues on the path 77 to the block 78 where the key is serviced. Depending on what sort of key is serviced, the program continues either on path 80 if, for example, an alphanumeric key has been depressed, or on path 81 if an operator depresses a memory display control key leading to the memory swap routine 82 in which character bytes in various memories are interchanged. The program may also continue from the service key routine 78 through the path 83 to the read/write to display routine 84 which routine is also coupled by the path 85 to the memory swap routine 82, as required. Returning to the EXCFLG decision block 72, if the EXCFLG is set, the program continues on the yes decision path 86 through the clear EXCFLG block 87. The program then continues to the voice identification transmit decision block 88 where if a voice signal is to be transmitted the yes path 90 continues the program. If a voice message is not to be transmitted, the program continues on the no path 91 to the emergency message transmission block 92 from which a yes decision puts the program onto the path 90. A no decision causes the program to proceed on path 93 to the message receipt decision block 94 with a yes decision being processed through path 95 to the program block for processing received messages 96, which is further coupled by a path 97 to the read/write to display block 84 and by path 98 to the memory swap block 82, as required. If a message has not been received, the program continues on the no decision path 100. After the received message has been processed in block 96 the program continues on path 101. Both paths 100 and 101 feed path 102 which proceeds to the decision block 103 which determines whether the re-transmit time out timer is timed out. The purpose of the re-transmit time out timer is to provide a period of time during which a base station acknowledgment is waited for, after which period the message may be again transmitted if no acknowledgment was received and if the message has not been transmitted, for example, five times. If the re-transmit time out timer has not reached zero, the program continues on path 104 to the decrement time out timer block 105, and thereafter the program continues on path 107 to the executive exit block 108. If the decision in the re-transmit time out timer 103 is that the timer has timed out, the program continues on the yes decision path 112 to the decision block 113 where it is determined whether the mobile data terminal is to transmit a message or not. If no, the program continues on the path 114 to the executive exit block 108. If the mobile is to transmit, the program continues on the line 116 to the block 117 in which the transmit flag is set and in which the transmit message is processed. This same block 117 is also fed by the yes path 90 from the emergency and the voice ID transmission decision blocks 88 and 92. Decision block 117 also is coupled to the read/write display and memory swap routines 119 which are similar to blocks 82 and 84. The program proceeds from block 117 to wait for the interrupt clock block 118. After an interrupt clock is received, a bit to be transmitted is provided to the transmit circuitry and the program proceeds to the decision block 120 where the message complete decision is made. If the decision is yes, the program proceeds on the path 121 to the block 122 where timer flags are set, if appropriate, and the transmit flag is cleared, since the transmit flag has previously been set in block 117. If the decision is no, the program proceeds on the path 123 and loops back to the block 118 to await another interrupt clock.

Referring to FIG. 2B, the clock interrupt block 130 is activated when a clock pulse transition corresponding to the transmit and receive data clock (on signal line 42 from clock source circuit 41 in FIG. 1) is received. This signal will interrupt the program as described hereinabove, and the microprocessor will stop and proceed to process the clock interrupt routine of FIG. 2B. The program proceeds to the EDGCNT decision block 131 where it is determined whether a predetermined count N has been reached. If the count has not been reached, the program continues on path 132 to the increment EDGCNT block 133. If the decision is yes, the program proceeds on the path 134 to the set EXCFLG block 135, and then to the clear EDGCNT block 136. Note that the EXCFLG is set after a predetermined period of time (determined by N clock interrupts). Setting of the EXCFLG provides for execution of the message processing routines which are entered at decision block 72 by means of path 86 in FIG. 2A, as described hereinabove. During the time that EXCFLG is not set, the key scan routine 74 is repetitively serviced. Returning to FIG. 2B, the program then proceeds to the transmit flag decision block 137 which queries the decision previously made in block 117 of FIG. 2A. If the answer is not, the program proceeds on the path 138 to the block 140 in which a single received bit is processed. If the answer is yes, the program proceeds on yes path 141 to the block 142 in which a single transmit bit is processed. The program then returns to the main program of FIG. 2A through the return block 143.

Since the clock interrupt routine of FIG. 2B (blocks 130 through 143), has priority in the microprocessor logic scheme, whenever a clock interrupt signal occurs, the microprocessor will stop execution of the key scan or transmit and receive executive programs of FIG. 2A to process one received or one transmitted bit as appropriate. Note if the transmit flag is not set, that the system will process one received bit for every clock interrupt pulse. The received bit oftentimes may not be a message information bit but the system makes that decision after processing the bit along with other received bits.

Referring to FIG. 3 of the drawing, a representation of a formatted terminal receive or transmit message is shown. This signal format is very similar to that disclosed in the aforementioned manual 68P81023E60 and U.S. Pat. No. 3,906,445, Beckmann, et al., assigned to the same assignee as the present invention, which patent is incorporated by reference into this application. The data message as shown in FIG. 3 of the drawing is arranged for transmission and reception through the radio links (e.g. see U.S. Pat. No. 3,980,824) coupling data terminals to base stations in such a manner that the data bits are transmitted twice, each message transmission being interleaved with the other with one transmission being delayed from the other by 64 bits, in a manner similar to the system disclosed in the aforementioned Beckmann, et al. patent.

The 16 ID bits are twice contained within a message. Each of these 16 bit ID data fields identifies a particular mobile unit and are set by mechanical switches within a mobile data terminal unit.

The four bit status data field of a mobile unit message represents sixteen possible operational statuses of a mobile unit, for example, that the unit is available, en route, at the scene, out of service, or that the officer is out of the vehicle. When transmitted from a base station to a mobile unit, the status data field is used, for example, to request that a message be printed on a mobile printer in the officer's vehicle, that a message is waiting at the base station for the mobile unit, or that the base clear the mobile terminal display.

The four bit request data field is transmitted from a mobile data terminal to a base station for informing the base station, for example, that a text message, an acknowledgment message, or a predetermined message such as a vehicle license check, driver's license check, wanted person check, parking violation, or traffic offense is being sent. The mobile data terminal also uses this data field to inform the base station that another message is available for the base station, that a voice signal is to follow, that an emergency situation exists, and that a new terminal status has been accomplished. The base station when transmitting to a mobile data terminal uses the four bit request data field to inform the mobile unit that the message is a high priority message, that manual acknowledgment is required, and that a status change is required of the mobile data terminal.

The text/ACK two bit data field identifies the signal as a non-text message, a text message, or a normal acknowledgment. This data field may also be used to indicate that the message has been received without error but the text was not able to be stored in the receive memory because it was occupied.

The text data field consists of N six bit bytes, where N ranges from 0 to 239. When displayed on an alphanumeric display, a text message may be displayed as six lines of forty characters each, except for the last line which contains 39 characters. Interpretation of four of the characters has been changed from the ordinary ASCII interpretation to provide four new control characters. These control characters are Protect Toggle PT, Blink Toggle BT, Carriage Return CR and Cursor Positioning CP. The Protect Toggle PT character informs a mobile data terminal that a message received from the base station is either protected or unprotected, that is, that the mobile data terminal operator can edit or change certain character fields within a received message. Messages received without a PT character contained therein are defined as protected, or non-editable. The first PT character in a message field determines that all following characters may be editable. The next occurring PT character redesignates the character field following to be non-editable characters. The PT character when displayed on a terminal is displayed as a protected blank, or space character. The Blink Toggle BT control character provides a mobile data terminal with blinking characters, indicating that such characters are specially designated protected characters. When no BT character is provided, the message is considered to be a non-blinking message. BT characters in a message are displayed as space characters. The carriage return signal CR causes insertion of space characters to the end of the line in which it occurs.

The cursor position control character CP provides a message received at a mobile data terminal with a cursor which may be placed anywhere within the editable portion of a message. Without a CP control character, the cursor will be positioned at the first editable position. When placed within a protected field, the CP character will be replaced with a protected blank character and a cursor will appear at the beginning of the next unprotected data field on the display. The last cursor positioning character in a message received also provides definition of the minimum number of characters which might be edited and returned from the mobile to the base.

The six bit stop character occurs in both text and non-text messages, but not acknowledgments, and provides a message format compatible with prior art data terminals such as disclosed in U.S. Pat. No. 3,906,445.

The control number six bit character data field is a message identifier which is used to prevent a base or a mobile unit from accepting duplicate copies of the same message. Each message originating source independently assigns a control number to a message transmitted from that particular installation. Upon powering up of a terminal, the control number is set to zero. Each new message thereafter increments the control number by one. Retransmissions of a message do not increment the control number.

The cyclical redundant check (CRC) byte data field includes two six bit data bytes which are calculated from the ID, status, request, text/ACK, text, stop, and control number data fields. If a message is an acknowledgment, then no CRC bytes are added to a message. A cyclical redundant check byte is calculated by first setting the CRC byte equal to zero and then for each byte of data calculating a new CRC byte by exclusive ORing each data byte with the previously calculated CRC byte. Appropriate shifting and exclusive OR operations as required are performed. The CRC bytes are utilized to check for the possibility of error within a message.

A formatted message as described above for FIG. 3 is preceded by a system settling tone which consists of a series of alternating ones and zero bits and a pseudo-random data field. This settling tone provides for establishing transmitting equipment audio signal paths and for synchronizing data clocks. The pseudo-random data field consists of a predetermined pattern and provides the remainder of the bit clock synchronization for a receiver as well as providing a message start indicator for a receiver (e.g. see U.S. Pat. No. 3,906,445).

Figure 4A:
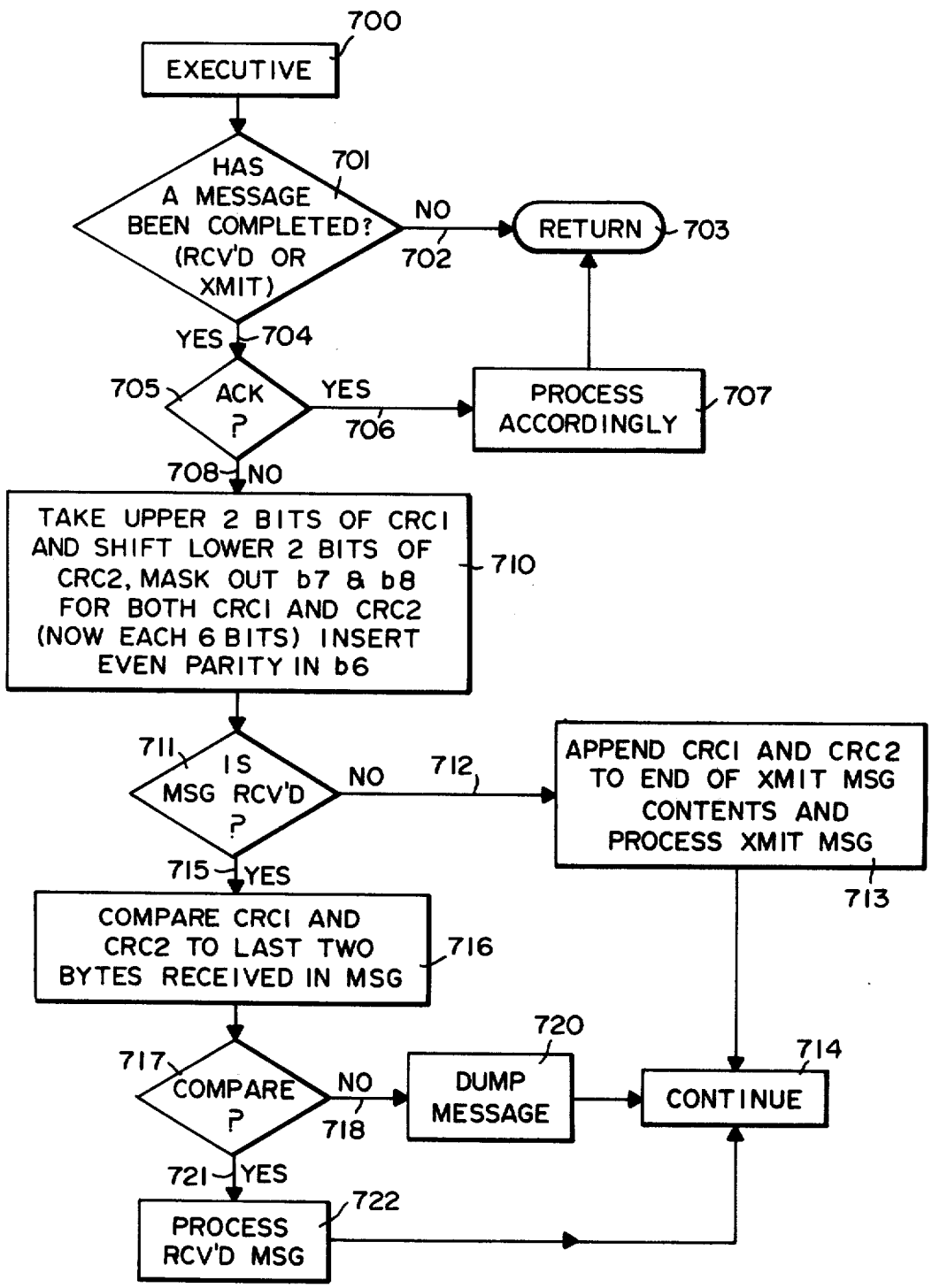
FIGS. 4A and 4B are flowcharts of a cyclic redundancy character calculation routine according to the invention.

Referring to FIG. 4A of the drawing, a subroutine stored, for example, in a ROM memory is shown for processing the CRC bytes. The addition of the CRC characters greatly reduces the number of undetected errors in messages which are processed to completion by the mobile data terminal. This routine may be called from block 96 or block 117 of the executive program of FIG. 2 and is entered as indicated in block 700 and the program proceeds to the decision block 701 where it is determined whether a received or transmitted message has been completed. If not, the program proceeds by means of path 702 to return the program as indicated by block 703. If the decision is yes, the program proceeds on the path 704 to the decision block 705 which determines whether the message is a text message or merely a message acknowledgment. If the message is an acknowledgment of a message, the program proceeds by the path 706 to the block 707 where the acknowledged message is appropriately processed and the program eventually returns as indicated by block 703. If the message is not an acknowledgment, that is a text message, the program continues on the path 708 to the block 710 where a bits manipulation routine is performed. The program then proceeds to the decision block 711 where it is determined whether the message is a received message. If not the program proceeds on the path 712 to the block 713 where two CRC bytes are appended to the end of the transmit message contents and that message is further processed. The program then continues as indicated by block 714. If the message is a received message the program proceeds by means of path 715 to the block 716 where a comparison of the two calculated CRC bits to the last two bits actually received in the message is made. The program proceeds to the decision comparison block 717. If the calculated and the received CRC bits are identical, the program proceeds by means of path 721 to the block 722 where the received message is then processed and the program then continues to the executive program of FIG. 2A as indicated in block 714. If the calculated and the received CRC bits do not compare, by means of path 718 the program proceeds to the block 720 and the received message is dumped from memory (i.e. stored message is obliterated) and the program continues at block 714.

Figure 4B:
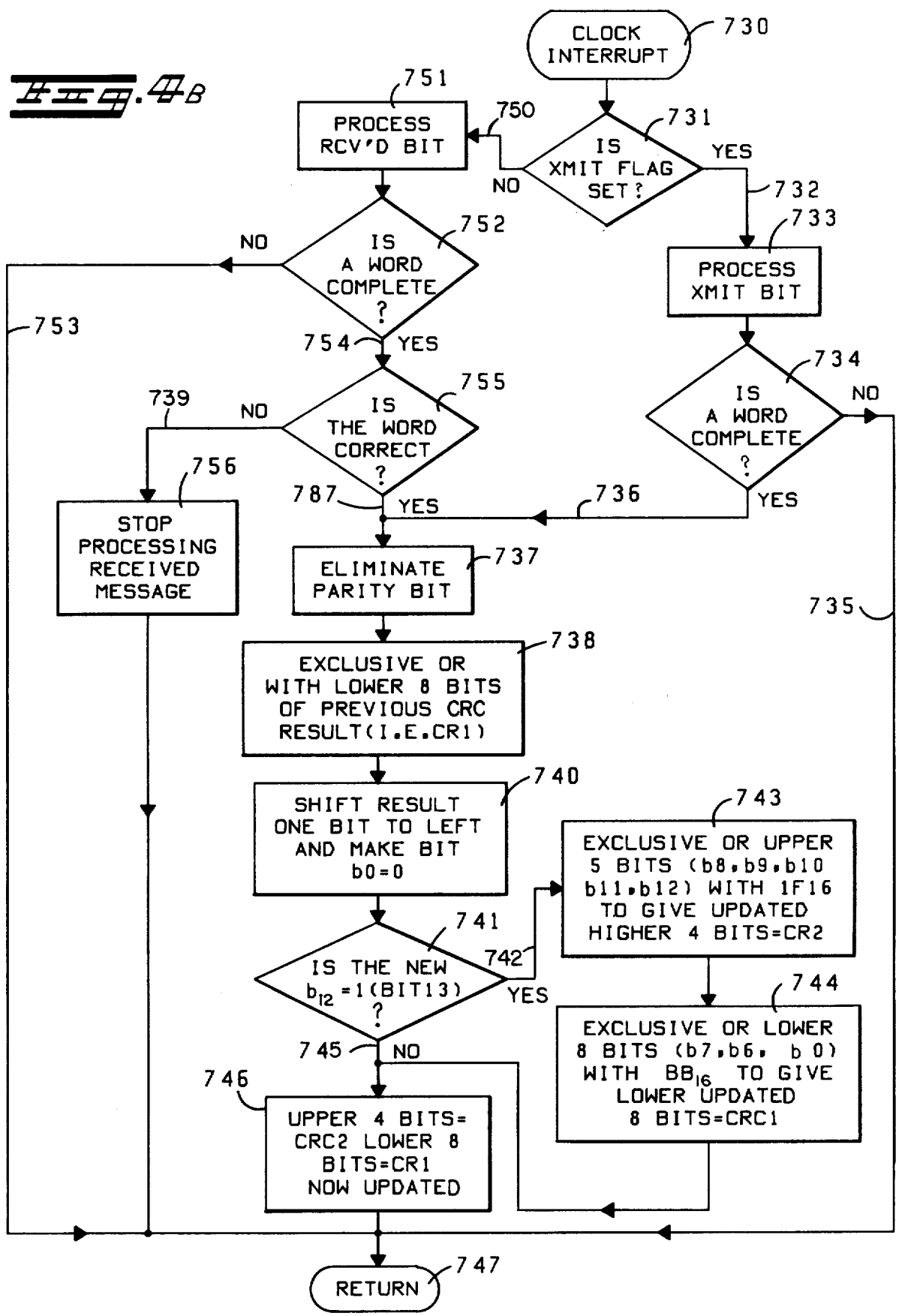

FIG. 4B is a detailed flowchart of blocks 137, 140 and 142 of the clock interrupt routine of FIG. 2B where block 731 of FIG. 4B corresponds to block 137 of FIG. 2B. Referring to FIG. 4B of the drawing, when a clock interrupt occurs during the CRC calculation routine of FIG. 4A as indicated by block 730 the program proceeds to the decision block 731 where it is determined whether the transmit flag has been set. If yes, the program proceeds by path 732 to the block 733 where a transmit bit is processed. The program then proceeds to the decision block 734 where it is determined whether a word is complete. If not the program proceeds by path 735 to the return block 747. If the transmit word is complete, the program proceeds by path 736 to the block 737 where the parity bit contained therein is eliminated for purposes of this calculation. The program then proceeds to the block 738 where the transmit word is exclusive ORed with the lower eight bits of the previous result for the first CRC byte. The program then proceeds to block 740 where a one-bit shift and setting of the lowest order bit to zero are performed. The program then proceeds to decision block 741 where it is determined whether the new 13th bit equals one. If yes, program proceeds by yes path 742 to the block 743 where an exclusive OR operation is performed to update the higher order four bits. The program proceeds to block 744 where another exclusive OR is performed on the lower eight bits of the CRC byte. If the decision in block 741 was no, the program also proceeds by path 745 to the block 746 where the two CRC bytes are updated. The program then returns by means of block 747.

Again referring to FIG. 4B of the drawing, if the transmit flag is not set the program proceeds by path 750 to the block 751 where the received bit is processed. The program then proceeds to the decision block 752 where it is determined whether a received word is complete. If not, the program proceeds by path 753 to the return block 747. If yes, the program proceeds by path 754 to the decision block 755 where it is determined whether the word is correct. If not, the program proceeds by no path 739 to the block 756 where the received message is no longer processed and the program returns by block 747. If it is determined that the received word is correct, the program proceeds by means of yes path 787 to the block 737 and the program proceeds as described hereinabove.

FIG. 5a is a flowchart of a subroutine that depicts an algorithm for generating the control number of a transmit message. This routine may be called from block 117 of the executive in FIG. 2A. This routine is initiated by the transmit button being depressed as depicted in block 180. The message is transmitted as indicated in block 181 with the program proceeding to the decision block 182 where the system is queried whether or not an acknowledgment has been received from the base station. If the answer is yes, the program proceeds on line 183 to the block 184 wherein the message control number is incremented by one. The program then proceeds to the decision block 185 where it is determined whether the message number is greater than hexidecimal 40. If the answer is no, the program proceeds by means of path 186 to a stop as indicated by block 187. Otherwise, yes path 197 is taken to block 198 where the message number is set to zero. If an acknowledgment is not received, the program proceeds from block 182 by path 188 to another decision block 190 where it is determined whether the required number of further re-transmissions of a message have been made. If the message has not been retransmitted the required number of times, the program proceeds on the path 191 to decision block 192 where it is determined whether the message has been changed, and if not, then on path 193 to the block 181 where the message is again transmitted. If the message has been changed, or the required number of retransmissions has been attempted, the program proceeds from decision block 190 and 192 by yes path 194 to a decision block 195 where it is determined whether the message number is zero. If so, the program proceeds by yes path 199 to the stop block 187. The message number being zero indicates that the terminal has not sent a message since the time that power has been applied to the terminal. If the message number is not zero, the message number proceeds by path 196 to block 184 where the message number is incremented by one.

Referring to FIG. 5b of the drawing, a flowchart for providing a message control number for received messages, may be called from block 96 of the executive in FIG. 2A and begins with a block 200 and then proceeds to a decision block 201 at which it is determined whether the control number is zero. If the answer is no, the program proceeds on a path 202 to the block 203 in which the control number is compared with the last received control number and the program proceeds to a block 204 in which it is determined whether the control numbers match. If the numbers match, the program proceeds on path 205 to the block 206 where the received message is cleared and the program proceeds to block 207 where an acknowledgment is sent. If the numbers do not match, the program proceeds by no path 211 to decision block 209. Also, if the control number equals zero, the program proceeds on path 208 to the decision block 209 where it is determined whether a message has been loaded into the computer storage memory, if said memory is available. If the message has not been loaded, the program proceeds on path 210 to the block 212 which requires a busy acknowledgment signal to be sent to the message source indicating that the data terminal cannot accept that message at that time. If a message has been loaded into the terminal memory, the program proceeds on path 213 to the block 214 where the message is processed. After processing the program proceeds to block 207 where an acknowledgment message is received.

Referring to FIG. 6 of the drawing, a routine for implementing the Protect Toggle PT, and the Blink Toggle BT features is shown. The routine may be called from blocks 78 and 82 of the main routine in FIG. 2A and begins with block 220 in which the blink bit is cleared, the protect bit is set, the cursor address is cleared, the character counter is cleared, and the transmit counter is cleared. The program proceeds to block 221 where a received character is fetched, said character being pointed at by the character counter. The program then proceeds to a decision block 222 where it is determined whether the character fetched is a control character or not. If the answer is no, the program proceeds on path 223 to the block 224 where the present blink status is added to the instant character. The blink and protect status of the character are added to the six information bits of a character and form the seventh and eight bits thereof. The program then proceeds to write the character into display memory as such in block 225 of the program. The program then proceeds to block 226 where the character counter is incremented and to a decision block 227, where it is determined whether the character counter is at maximum, indicating the end of the message to be displayed. If the character counter is not at maximum, the program proceeds by path 228 to loop back to block 221 to fetch a new character. If the character counter is at maximum, the program proceeds by path 229 to a stop block 230. If a control character has been fetched, the program proceeds on path 231 to the decision block 232 where it is determined whether the character fetched is a PT character. If the decision is yes, the program proceeds on line 223 to the decision block 234 where it is determined whether the blink bit has been set. If the blink bit has been set, the program proceeds on path 235 to the block 236 which replaces the character with a space, and thereafter returns to block 224. If a PT character is present, and the blink bit is not, then the program proceeds on line 237 to the block 238 where the toggle protect bit is set. The program returns on path 240 to the block 236. If a PT character has not been received, the program proceeds on path 241 to the decision block 242 where it is determined whether a blink toggle character has been received. If yes, the program proceeds on path 243 to the decision block 244 where it is determined that the protect bit is set. If it is not, the program proceeds on line 245 to the block 236. If the protect bit has been set, the program proceeds on path 246 to the block 247 where the toggle blink bit is set and the program continues on path 248 to block 236. If a blink toggle PT character is not received, the program proceeds on path 250 to decision block 251 where it is determined whether the first cursor positioning control character has been received. If the answer is no, the program proceeds on line 252 to the block 253 where the contents of the character counter are placed into the transmit counter and the program proceeds on line 254 to block 236. The transmit counter defines the number of characters which are transmitted from a mobile data terminal. If the character fetched is a cursor positioning character, CP, the program proceeds on line 225 to block 256 which places the character counter contents into the cursor address and the program continues on path 257 to block 236.

Referring to FIG. 7 of the drawing, the routine for calling up the status condition of the data terminal to be presented on one line of the display terminal is shown. This routine is called from block 78 of the main routine in FIG. 2A and is entered from the key scan routine block 260. Proceeding to the decision block 261, it is determined whether a valid key has been depressed. Blocks 260 and 261 in FIG. 7 correspond to blocks 74 and 75, respectively, in FIG. 2A. If not, the program returns to the key scan routine by no path 262. If yes, the program proceeds by yes path 294 to the decision block 263 where it is determined whether a transmit key has been depressed. If a transmit key has not been depressed, the program proceeds on path 264 to the decision block 265 which determines whether a status line key for displaying the status line on the display terminal has been depressed. If not, the program proceeds on path 266 to the decision block 267 where it is determined whether or not the clear key has been depressed. If not, the program proceeds on path 268 to the block 270 for servicing the particular key depression (not XMIT, status line, or clear key). After servicing the key, the program proceeds to the clear display block 271 and the program then returns through block 295. If a transmit key has been depressed, the program then continues on path 272 to the block 273 wherein the message "TRANS" is loaded into the status display for viewing. The program then proceeds to determine whether the status key has been depressed in the decision block 274. If yes, the program proceeds on path 275 to the block 276 where a new status is entered into the status line and the program proceeds to the decision block 277 where it is determined whether the status line is being displayed or not. If not the program proceeds on line 278 to the block 280 to set the STAFLG flag and interchange, or swap, the bottom line of the display with a non-display buffer and further to blank the top five lines of the display. This sixth line of the display, therefore, is used to display the status of the terminal. If the status line is being displayed, the program proceeds by means of path 281 to the return block 282 and returns to the program. If the transmit key has been depressed but the status key has not been depressed, the program proceeds by path 283 to the decision block 277 and the program operates as previously described. If the clear key has been depressed, the program continues on path 284 to the decision block 285 where it is determined whether the next message buffer contents are being displayed on the screen. If yes, the program proceeds by means of path 286 to the block 287 and clears the next message buffer. The program then proceeds to the decision block 277 where it is determined whether the status line is being displayed and the program continues as previously described. If the clear key has been depressed but the next message buffer is not being displayed, the program proceeds on path 288 to the decision block 290 where it is determined whether the status line is being displayed. If it is being displayed, the program proceeds by path 291 to return as indicated by block 292. If the status line is not being displayed, the program proceeds by path 293 to the block 271 and the display is cleared.

The above discussion has described how the status display line on the message display screen is controlled by key depressions. The executive routine (see FIG. 2A), that is, the program events which are not part of the key scan routines nor the interrupt routines, also may control the status line display. Block 300 of FIG. 7 indicates that this routine is entered from block 96 of the executive program in FIG. 2A and proceeds to a decision block 301 where it is determined whether a priority or manual acknowledgment required message has been received. If not, the program proceeds by path 302 to the decision block 303 where it is determined whether a base acknowledgment message has been received. If not, the program proceeds by path 304 to the decision block 305 where it is determined whether the fifth transmission has been timed out, that is, whether the message has been retransmitted five times to the base and not been acknowledged. If the fifth transmission has not been sent, the program proceeds on path 306 to the decision block 307 where it is determined whether a text transmit key has been depressed and whether the display is editable. If not, the program proceeds on path 308 to continue by block 310. If the text transmit key has been depressed and if the display is now editable, the program proceeds on path 311 to the block 312 where an "ERROR" message is displayed on the status line. The program then proceeds to the decision block 277 wherein it is determined whether the status line is being displayed. The error display indication indicates an operator error in attempting to perform a nonallowable routine. If a priority or manual acknowledgment message has been received, the program proceeds by means of path 313 to the block 314 where a manual acknowledgment required or priority message is loaded into the status register. The program then proceeds to the status display condition decision block 277. If a base acknowledgment has been received the program proceeds on the path 315 to the block 316 where a "ACK OK" message is located is loaded into the status line. The program then proceeds to the decision block 277. If the fifth transmission has occurred the program proceeds on the path 317 to the block 318 where a "NO ACK" message is loaded into the status line and the program proceeds to the status line display condition decision block 277.

Referring to FIG. 8 of the drawing, a routine for finding the character to be displayed in the last character position on the screen, or the memory status character is shown. This character is not a message character and is used to display the status of received messages within the terminal and whether or not the terminal has a received but not yet displayed a message contained therein. This program is entered from the key service routine (block 78 of the main routine of FIG. 2A) as shown in block 320. The program proceeds to the decision block 321 where it is determined whether the status line is being displayed; if not, the program proceeds on path 322 to the decision block 323 where it is determined whether the compose memory is being displayed. The compose memory is an off line memory which may be used by an operator to formulate, or compose, a message. If the compose memory is not being displayed the program proceeds on a path 324 to the decision block 325 where it is determined whether an auxiliary memory is being displayed. If not, the program proceeds on path 326 to the block 327 which causes the character "N" to be located in the last character position and the program then proceeds to the decision block 328 where it is determined whether the mobile knows that a message is waiting at the base station for said mobile. If a message is waiting, the program proceeds by yes path 329 to block 342. If no message is waiting, the program proceeds on path 330 to the block 331 where a cursor is inserted if appropriate. The program proceeds then to return as shown by block 332. If the status line is being displayed on the viewing screen, the program proceeds on path 333 to the block 334 and an "S" character is loaded into the last character position. If the compose memory is being displayed the program proceeds by means of path 335 to the decision block 336 and a "C" character is loaded in the last character position on the display. If the auxiliary memory is being displayed, the program proceeds by means of path 337 to the block 338 and an "R" character is loaded into the last character display position. After one of the above three characters has been loaded into the last character position the program proceeds to the decision block 340 where it is determined whether the next message memory, that is, the memory which receives messages from an external source, is full. If yes, the program proceeds on the path 341 to the block 342 and the last character is caused to blink, or flash, on and off. If no, the program proceeds to the decision block 328 by means of path 343 where it is determined whether or not the mobile knows that a message is waiting at the base.

FIG. 9 describes a routine for determining that particular baud rate which has been preselected by system maintenance personnel by means of suitable jumper connections in the X/R board 40 of the mobile data terminal. This is part of the terminal power up routine (initialize block 71 of the main routine in FIG. 2A) and begins at the start block 350 and proceeds to a block 351 which performs a check sum test on certain of the program steps to determine whether the program is intact. The program then proceeds to the decision block 352 where it is determined whether the test has been successful. If not, the program proceeds by means of path 353 to the wait condition block 354. If the test is successful, the program proceeds by means of path 355 to the block 356 and the RAM and PIA's are initialized. The program then proceeds to block 357 and the interrupt masking for the microprocessor is disabled, the initializing routine test having been completed. The program then proceeds to block 358 and waits for the first clock interrupt signal. When the first clock interrupt signal is received, EDGCNT is incremented in the clock interrupt routine of FIG. 2B as shown by blocks 370 through 373. The program continues through the block 360 which increments a counter by one. The program then continues to a decision block 361 where EDGCNT is tested. If the count is not equal to two, the program proceeds by path 362 to the block 360 where the counter is again incremented. If the EDGCNT equals two the program proceeds by means of the path 363 to the decision block 364 where it is determined whether the counter 360 has exceeded some number K. If the counter has exceeded that number, the program proceeds by means of path 365 to the block 366 which sets a variable called BAUD which identifies the system bit clock rate which has been established in the X/R board 40. If the counter number is not greater than the number K, the program proceeds by path 367 to the main program which continues as shown by block 368 thereby leaving the variable BAUD at its initialized value.

Note that when the variable BAUD is established, the variable N of block 131 of FIG. 2B is also established because N is determined as a function of BAUD to be such that the time period at which EXCFLG is set is approximately the same fixed value for all values of BAUD. FIG. 9 also shows a block 370 to indicate that when the interrupt routine of FIG. 2B is entered the EDG CNT is incremented as shown by block 371. The block then continues interrupt processing as shown in block 372 and at the appropriate step will return to the main program as indicated by block 373.

Referring to FIG. 10 of the drawing, a routine for detecting the pseudorandom message preamble is shown (e.g. see U.S. Pat. No. 3,586,776 for pseudorandom detector circuitry). The routine is called from block 140 of the clock interrupt routine in FIG. 2B and begins with block 380 which describes a comparison between a received pseudorandom bit and a calculated pseudorandom bit. The calculated pseudorandom bit is derived from a routine which simulates a pseudorandom generator. The program proceeds to a decision block 381 where it is determined whether or not the bits match. An up/down counter is provided for counting the differences between matching and nonmatching bits, this counter being called the INT CNT counter. If the bits match, the program proceeds down signal path 382 to the decision block 383 where it is determined whether the count is greater than or equal to fifty. If yes, the program proceeds on signal path 384 to the decision block 385. If the count is less than fifty, the program proceeds by signal path 386 to the block 387 where the counter is incremented by one. The program then proceeds to the next decision block 388 where it is determined whether or not the count is greater than or equal to thirty. If the count is greater than or equal to thirty, the program proceeds by signal path 389 to the decision block 385. If the count is less than zero, the program proceeds by signal path 399 to the block 390 and the counter is incremented. The program then proceeds to the decision block 391 where it is determined whether the counter is greater than or equal to zero. If so, the program proceeds by means of path 392 to the decision block 385. If not, the program proceeds by means of signal path 393 to the block 394 where the counter is incremented. It can be seen that if the bits match, the amount by which the counter is incremented is a nonlinear function of the present value of the count. Similarly, if the bits do not match the program proceeds by means of signal path 395 and through various blocks 910-915, if applicable, to decrement the counter depending upon whether the respective counters have counts therein less than or equal to −50, −30 or 0. The decision block 385 determines whether the absolute value of the counter is less than or equal to 25. If so, the program proceeds on signal path 396 to block 406 to calculate the next expected bit using the last received bit and the program proceeds to the end block 397. If the absolute value is not less than or equal to 25, the program proceeds by means of signal path 398 to the block 400 where the next expected bit is calculated using the last calculated bit and the program proceeds to the block 401 where the last seven calculated bits are compared with seven previously received bits. The decision block 402 tests the comparison. If the bits do not compare, the program proceeds by means of signal line 403 to the end block 397. If the bits do compare, the program proceeds by means of signal path 404 to block 405 which is the start to receive routine. If the receiver routine is started, the program has determined that sufficient portions of the correct pseudorandom sequence have been received.

Referring to FIG. 11 of the drawing, a routine for determining whether the microcomputer is improperly functioning is shown. On the X/R board 40 is a deadman timer circuit (65 in FIG. 1) which, if not periodically inputted with logic transitions, or toggle signals, will restart the microprocessor (11 in FIG. 1). The program routine described in FIG. 11 beginning at block 421 is a more detailed flowchart of the blocks 72, 74, 75 and 78 of the main routine in FIG. 2A and generates logic transitions at certain times in the program sequence which are provided to the deadman timer circuit. The transmitted data output (20A in FIG. 1) is used as a toggle signal. In a nonmaskable interrupt routine as indicated by block 410 and block 411 a flag called XMTFLG is set and the program is then returned by block 412. A maskable interrupt routine block 413, which is a duplicate of FIG. 2B, determines by means of the decision block 414 whether the XMTFLG flag has been set. If not, this indicates that the processor is not processing transmitted bits but is processing received bits as shown by the path 415 to block 416. If the flag is set, indicating transmission, the program proceeds by means of signal path 417 to the block 418 where the next bit to be transmitted is processed. In both cases the program returns from the interrupt routine as indicated by block 420. During the main program, the decision block 421, similar to the decision block 72 of FIG. 2A, tests whether the executive program flag has been set. If not, the program continues through the key scan routine by means of signal path 422 and block 423 (similar to block 74 in FIG. 2A). The program then continues to the block 424 which contains a toggle circuit for the deadman timer circuit. The program then continues to service keys as indicated by block 425 (similar to block 78 in FIG. 2A). If the EXC FLG flag is set, the program proceeds by means of path 426 to the decision block 427 where it is determined whether a message has been received, similar to block 94 of FIG. 2A. If a message has been received, the message is processed through block 428 by means of a path 430. If the message has not been received, the signal is processed by means of path 431 to the decision block 432, which is also entered after the received message is processed by block 428. In block 432, it is determined whether a mobile is to transmit. If not, the program is returned to the key scan routine by means of path 433. If the mobile is to transmit, the program continues on path 434 to the block 435 where a transmit turn on delay is generated. The program then proceeds to wait for an interrupt signal as shown by block 436. Such an interrupt occurs either at the end of a timeout delay of block 410 (a nonmaskable interrupt caused by signal line 46 from the push-to-talk and timeout timer circuit 45 in FIG. 1) or the system clock interrupt of block 413 (a maskable interrupt caused by signal line 42 from clock source circuit 41 in FIG. 1). When an interrupt occurs the program continues to the decision block 437 where it is determined whether or not a XMT FLG flag has been set. If not, the program continues on path 438 to the block 440 and the transmit output is toggled. If the XMT FLG flag is set, the program continues on path 441 to the decision block 442 where it is determined whether the transmit message has been completed. If not, the program continues on path 443 to the wait for interrupt condition as shown in block 436. If the message is complete, the program continues by yes path 444 to the block 445, where the XMT FLG flag is cleared and the program returns to the key scan routine in block 423.

Referring to FIG. 12 of the drawing, a key scan routine is shown, which illustrates in detail blocks 72, 74, 75 and 78 of the main routine in FIG. 2A. Block 450 begins the program which proceeds to block 451 and the lock out and key scan counters are cleared. The program proceeds to the decision block 452 where, as described hereinabove, the EXC FLG flag is tested (similar to block 72 in FIG. 2A). If the flag is set, the program proceeds by means of signal path 453 to the block 454 and the executive program is executed and the flag is cleared. If the flag is not set, the program continues on the path 455 to the block 456. The next key switch is read in. The program then continues to the decision block 457 where it is determined whether the key switch has been closed. If yes, the program proceeds on the path 458 to the block 460 which increments an external counter indicative of key depressions. After this increment or if the key switch is not closed, the program proceeds on path 461 to the block 462 where the counter is incremented. The program then proceeds to the decision block 463 where it is determined whether the counter equals 80. If not, the program proceeds on the path 464 back to the block 456. If yes, the program proceeds on the path 465 to the block 466 and the deadman timer output is toggled. The program proceeds to the signal block 467 where it is determined whether the external counter of block 460 has a count equal to zero. If yes, the program proceeds back to the begin block 450 on path 468. If no, the program proceeds on path 470 to the decision block 471 where it is determined whether a lock out condition preventing further reservicing of the same key depression as a result of key switch bounce has been set. If yes, the program proceeds on path 472 to the block 473 and the counter of block 462 and the counter of 460 are cleared with the program proceeding back to the decision block 452. If the lock out is not set, the program proceeds on path 474 to the decision block 475 where it is determined whether the counter of block 460 equals one; if not, the program proceeds on path 476 to the block 450. If yes, the program proceeds on path 477 to the block 478 and the scan counter is incremented. The program then proceeds to the block 480 where it is determined whether the scan count equals some predetermined number N. If not, the program proceeds on the path 481 to the decision block 452. If yes, the program proceeds on path 482 to the decision block 483 where it is determined whether the same key has been depressed for all the scans. If not, the program proceeds by means of path 484 back to the begin block 450. If yes, the program proceeds by means of path 485 to the block 486 and the lock out is set and the program proceeds to block 487 for servicing a key.

Referring to FIG. 13 of the drawing, a routine for implementing the carriage return/tab function is described. The routine is called from block 78 of the main routine in FIG. 2A and begins in a decision block 490 where it is determined whether the display contains protected fields of information. If yes, the program proceeds on path 491 to the decision block 492 where it is determined whether there are any protected characters to the right of the cursor on the present line. If not, the program proceeds on path 493 to the block 494 and the cursor is moved to the first editable position on the next line, scrolling to the top of the display as necessary. The program then proceeds to the stop block 495. If the display contains protected fields and if there are any protected characters to the right of the cursor on the present line, the program proceeds on the path 496 to the block 497 and the cursor is moved to the next editable position, past the protected field if necessary and scrolling to the top of the display if necessary. If the display does not contain protected fields the program proceeds on the path 498 to the block 500 where it is determined whether the cursor is on the last line of the display. If not, the program proceeds on the path 501 to the block 502 where the cursor is moved to the beginning position on the next line. If the cursor is in a non-protected field and is on the last line of the display, the program proceeds on path 503 to the block 504 and the cursor is moved to the beginning of the first display line.

Referring to FIGS. 14A and 14B of the drawing, the routine for operator computer memory control and memory swapping is shown. In FIG. 14A, the key service routine at block 510, corresponding to block 74 of the main routine in FIG. 2A, leads to a decision block 511 where it is determined whether or not the status line key has been depressed. If not, the program proceeds on the path 512 to the decision block 513 and it is determined whether either a recall RCL i.e. (auxilliary AUX) or compose CMP memory key has been depressed. If not, the program by means of path 514 continues as shown by block 515. If the status line key has been depressed, the program continues by means of path 516 to the decision block 517 where it is determined whether the status line is being displayed. If yes, the program returns by means of a path 518 to the return block 519. If no, the program proceeds by the path 521 to the block 522 and the STAFLG flag is set and the program continues to block 523 where a data swap routine is performed which swaps the last line of the display with a non-display RAM memory called STARAM containing the status line information. If a memory key is depressed, the program proceeds on path 505 to the decision block 506 where it is determined whether the status line is being displayed on the terminal. If yes, the program proceeds by the path 507 to clear the STAFLG flag as indicated by block 508 and performs a swap with the last line of the display and a non-display RAM memory STARAM as indicated by block 524. This returns the status line information to STARAM and restores the original contents of the display. The program then proceeds to the decision block 525 which is also arrived at by no path 526 by means of the status line not being displayed. If the compose key is depressed, the program proceeds by means of path 527 to the decision block 528. If it is determined that the compose memory is not being displayed, the program proceeds by means of path 530 to the decision block 531 where it is determined whether the auxiliary memory is being displayed. If not, the program proceeds by means of path 532 to the block 533 where a VEWFLG flag is cleared. This flag indicates whether the receive buffer has been displayed. The program then proceeds to perform a swap, that is, interchange the 239 display characters with the non-displaying ROM memory TXTRAM for holding text as indicated by block 534. The program then returns as indicated by block 535. If the compose key is depressed and if the compose memory is being displayed, the program by means of path 536 returns as indicated by block 537. If the compose key is depressed and if the auxiliary memory is being displayed, the program proceeds by path 538 to the block 540 where an AUX flag is cleared, the AUX flag indicating whether the auxiliary memory contents is being displayed. As indicated by block 541, an interchange between the 239 display characters with a non-displayed RAM AUXRAM is performed, and the program is returned via block 537. If the compose key is not depressed, and if the auxiliary memory as indicated by decision block 529 is not being displayed, the program by means of no path 542 proceeds to the decision block 543 where it is determined whether the compose memory is being displayed. If not the program proceeds on path 549 and the VEWFLG flag is cleared as indicated by block 544. The 239 display characters are then interchanged with a non-display RAM memory TXTRAM as indicated by block 545. The program then proceeds to block 547. If the composed memory is displayed, the program then proceeds by the path 546 to the block 547 and the AUX flag is set. The program then proceeds to perform an interchange with the 239 display characters with a non-displayable RAM memory AUXRAM as indicated by block 541. The program proceeds to the return block 537. If the compose key is not depressed and if the auxiliary memory is being displayed, i.e. up, the program by means of path 559 proceeds to the return block 537.

Referring to FIG. 14B of the drawing, a routine is initiated when the next message key is depressed as indicated by block 550. The routine is called from block 82 of the main routine in FIG. 2A and proceeds to the decision block 551 where it is determined whether the received buffer memory is occupied. If not, the program proceeds on path 552 to the block 553 and the next message request is transmitted and the program returns as indicated by block 554. If the receive buffer memory is occupied, the program proceeds by path 555 to the decision block 556 where it is determined if the receive buffer is being displayed. If yes, the program proceeds on path 557 to the block 558 and the receive buffer memory is cleared. The program then proceeds to the block 559 where the VEWFLG flag is cleared and a 239 display character swap is made with a non-displayed RAM memory TXTRAM. The program proceeds to block 553 where a next message request is transmitted. If a receive buffer is not being displayed, the program continues on path 560 to the decision block 561 where it is determined whether the status line is being displayed. If yes, the program proceeds on path 562 to block 563 where the STAFLG flag is cleared and to block 564 where a swap with the last line of the display and a non-displayed RAM memory STARAM are made. If the status line is not being displayed, the program proceeds by path 565, or after the memory interchange in block 564, to the decision block 566 where it is determined whether the composed memory is being displayed. If not, the program proceeds by path 567 to the block 568 where the AUX flag is cleared and to block 569 where a swap between the 239 displayed characters and a non-displayed RAM memory AUX-RAM is performed. In this case, and also if the composed memory is being displayed, as indicated by the program path 571, the program proceeds to the block 572 where the VEWFLG flag is set and to block 573 where the 239 displayed characters are interchanged with a non-display RAM TXTRAM memory. The program then proceeds to return as indicated by a block 574.

Also referring to FIG. 14B of the drawing, if the program is in block 86 of the executive routine of FIG. 2A as indicated by block 575, the program proceeds to the decision block 576 where it is determined whether a text message has been received and stored. If yes, the program proceeds by means of path 577 to the decision block 578 where it is determined whether the status line is being displayed, or up. If not, the program proceeds by path 580 to a continue block 581. If a text message has not been received and stored the program proceeds by a path 582 to the continue block 581. If the status line is being displayed, the program proceeds by path 583 to block 584 and a next message key depression is simulated and the program continues at block 581.

Referring to FIG. 15 of the drawing, a routine for servicing a next message key is shown, which is called from block 78 of the main routine of FIG. 2A. The program begins with the next message key button being depressed as shown by block 590. The program proceeds to a decision block 591 where it is determined whether a received mesage is being displayed. If yes, the program proceeds by means of path 592 to the block 593 and the received message is cleared and, as indicated by block 594, a next message is requested from the base. If a received message is not being displayed the program proceeds by means of path 595 to the decision block 596 where it is determined whether the received memory is occupied. If not, the program proceeds by means of path 597 to the block 594 and a next message from the base is requested. If the receive memory is occupied the program proceeds by path 598 to the block 600 and the received message is displayed. Upon completion of the tasks in blocks 594 and 600, the program proceeds to stop block 601.

Referring to FIG. 16 of the drawing, a routine for processing an acknowledgment signal from an external source is described, which is called from block 96 of the executive in FIG. 2A. Block 610 indicates that an acknowledgment has been received and the program proceeds to the decision block 611 where it is determined whether a manual acknowledgment indicator is activated. If yes, the program proceeds by means of path 612 to the decision block 613 where it is determined whether the previous message contained a manual acknowledgment requirement. If yes, the program proceeds on path 614 to the block 615 where the manual acknowledgment indicator is cleared and the program then proceeds to the block 616 where the microcomputer processes the acknowledgment condition. Similarly, if the last message was not a manual acknowledgment and if the manual indicator is on, by means of path 617, the program goes to block 616 for processing the acknowledgment condition. If the manual acknowledgment indicator is not activated, the program proceeds by path 618 to the decision block 620 where it is determined whether a priority waiting indicator is activated. If not, the program proceeds by path 621 to block 616. If a priority waiting indicator is activated the program proceeds by path 622 to the decision block 623 where it is determined whether the last message contained a next message request. If no, the program proceeds by path 624 to the block 616. If yes, the program proceeds by path 625 to the block 626 for clearing a message waiting indicator means prior to processing the acknowledgment condition in block 616.

While a particular embodiment of the system according to the invention has been shown and described, it should be understood that the invention is not limited thereto since many modifications may be made. It is therefore contemplated to cover by the present application any and all such modifications that fall within the true spirit and scope of the basic underlying principles disclosed and claimed herein.

I claim:

1. A radio frequency digital data transmission system for communicating digital messages between a base station and a plurality of mobile stations, where the mobile stations each include a radio transceiver and a programmable data terminal coupled thereto for receiving and transmitting digital messages, wherein the programmable data terminal of each mobile station comprises:

means for generating a data clock signal;
means coupled to the radio transceiver for receiving in response to the data clock signal, successive bits of digital messages transmitted from the base station;
keyboard means including a transmit key and a plurality of alphanumeric keys;
display means including a plurality of display elements for visually displaying digital messages applied thereto;
means coupled to the radio transceiver for transmitting in response to the data clock signal, successive bits of digital messages applied thereto; and
processing means including a compose memory, a next message memory, a read-only memory for storing a control program and peripheral-interface-adapter means for interfacing the processing means to the data clock signal generating means, receiving means, keyboard means, display means and transmitting means; the processing means receiving a digital message entered from the keyboard means, storing the entered digital message in the compose memory, and applying the entered digital message to the display means; and the processing means further having an interrupt input coupled to the clock signal and being responsive to each predetermined logical state change of the clock signal for, under control of the control program, storing in the next message memory successive bits of a digital message received by the receiving means, and, when the transmit key is activated, applying successive bits of a digital message stored in the compose memory of the transmitting means.

2. The digital data transmission system according to claim 1, wherein said display means includes a status element, said processing means enabling the status element to display a first status character when all the bits of a digital message have been received by receiving means and stored in the next message memory.

3. The digital data transmission system according to claim 2, wherein said processing means in the programmable data terminal is responsive to succeeding digital messages received by the receiving means for blinking the first status character displayed in the status element of the display means.

4. The digital data transmission system according to claim 3, wherein said keyboard means of the programmable data terminal includes a next message key, said processing means responsive to a first activation of the next message key for enabling the digital message stored in the next message memory to be applied to the display means and thereafter transmitting an acknowledgment digital message to the base station.

5. The digital data transmission system according to claim 4, wherein said processing means is responsive to a second activation of the next message key for transmitting a polling digital message to enable the base station to retransmit previously transmitted digital messages.

6. The digital data transmission system according to claim 1, wherein said programmable data terminal includes a status line memory, said keyboard means includes a status line key, and said display elements of the display means are organized into a plurality of parallel lines each having the same number of display elements; said processing means sensing the status of pre-selected portions of the programmable data terminal and storing the sensed status in the status line memory, and said processing means enabling a predetermined line of display elements to display the status stored in the status line memory in response to a sensed change in the status from the previously sensed status and in response to an activation of the status line key.

7. A method for use in a radio frequency digital data transmission system where digital messages are communicated between a base station and a plurality of mobile stations, and where the mobile stations each include a radio transceiver and programmable data processing means coupled thereto for receiving and transmitting digital messages, said method for receiving a digital message and ignoring subsequent duplicates of the same digital message communicated between the base station and the mobile stations, said method comprising the steps of:
(a) appending control numbers to successive digital messages transmitted by the base station, wherein different control numbers are appended to different digital messages at the base station;
(b) comparing the control number of a received digital message to the control number of a predetermined number of previously received digital messages at a mobile station;
(c) accepting the received digital message if it has a different control number from that of the predetermined number of previously received digital messages at the mobile station; and
(d) discarding the received digital message if it has the same control number as that of a previously received digital message at the mobile station.

8. The method according to claim 7, wherein step (c) further includes the step accepting the received digital message if it has a predetermined control number.

9. The method according to claim 7, wherein step (a) further includes the step of consecutively numbering the control numbers from a predetermined minimum number to a predetermined maximum number.

10. The method according to claim 9, wherein said numbering step further includes the step of repeating the numbering from the predetermined minimum number when the control number is the predetermined maximum number.

11. A method for use in a radio frequency digital data transmission system where digital messages are communicated between a base station and at least one mobile station, and where the mobile station includes a radio transceiver and programmable data processing means coupled thereto for receiving and transmitting digital messages, said method for receiving a digital message and ignoring subsequent duplicates of the same digital message communicated between the base station and the mobile station, said method comprising the steps of:
(a) appending control numbers to successive digital messages prior to transmission by the base station or the mobile station, wherein different digital control numbers are appended to different messages at the base station or the mobile station, respectively;
(b) comparing the control number of a received digital message at the base station or the mobile station to the control number of a predetermined number of previously received digital messages at the base station or the mobile station, respectively;
(c) accepting the received digital message at the base station or the mobile station if it has a different control number from that of the predetermined number of previously received digital messages at the base station or the mobile station respectively; and
(d) discarding the received digital message at the base station or the mobile station if it has the same control number as that of a previously received digital message at the base station or the mobile station, respectively.

12. A method for use in a radio frequency digital data transmission system where digital messages are communicated between a base station and a plurality of mobile stations, and where the mobile stations each include a radio transceiver, programmable data processing means coupled to the radio transceiver for receiving and transmitting digital messages, a memory, a next message indicator, a visual display and a next message pushbutton, said method for enabling the mobile stations to retrieve digital messages previously communicated from the base station, said method comprising the steps of:
(a) receiving from the base station a first digital message and storing the first digital message in the memory;
(b) receiving from the base station a second digital message;
(c) actuating the next message indicator in response to receipt of the second digital message;
(d) accessing the digital message stored in the memory and displaying the accessed digital message in the visual display in response to a first activation of the next message pushbutton; and (e) transmitting a digital message to the base station for causing the base station to retransmit the second digital message in response to a second activation of the next message pushbutton.

13. The method according to claim 12, wherein step (a) includes the step of displaying the first digital message in the visual display if it is not in use, and step (b) includes the step of storing the second digital message in the memory.

14. The method according to claim 12, further including the steps of deactuating the next message indicator and repeating steps (a), (b), (c), (d) and (e) for succeeding digital messages.

15. A radio frequency digital data transmission system for communicating digital messages between a base station and a plurality of mobile stations, where the mobile stations each include a radio transceiver and a programmable data terminal coupled thereto for receiving and transmitting digital messages, wherein the programmable data terminal of each mobile station comprises:

means for generating a clock signal;

means coupled to the radio transceiver for receiving in response to the data clock signal, successive bits of digital messages transmitted from the base station;

a keyboard including a transmit key and a plurality of alphanumeric keys;

a display including a plurality of display elements for visually displaying digital messages applied thereto;

means coupled to the radio transceiver for transmitting in response to the clock signal, successive bits of digital messages applied thereto; and a microcomputer including a compose memory, a next message memory, a read-only memory for storing a control program and peripheral-interface-adapter means for interfacing the microcomputer to the receiving means, keyboard, display and transmitting means; the microcomputer receiving a digital message entered from the keyboard, storing the entered digital message in the compose memory, and applying the entered digital message to the display; and the microcomputer further having an interrupt input coupled to the clock signal and being responsive to each predetermined logical state change of the clock signal for, under control of the control program, storing in the next memory successive bits of a digital message received by the receiving means, and, when the transmit key is activated, applying successive bits of a control number and an entered digital message stored in the compose memory to the transmitting means, the microcomputer appending different control numbers to each entered digital message that is transmitted.

16. The digital data transmission system according to claim 15, wherein said base station appends different control numbers to each digital message transmitted to a mobile station, said microcomputer comparing the control number of each digital message received by the receiving means to the control number of previously received digital message and discarding the digital message received by the receiving means if its control number in the same as the control number of the previously received message.

17. A method for use in a radio frequency digital data transmission system where digital messages are communicated between a base station and a plurality of mobile stations, and where the mobile stations each include a radio transceiver and programmable data processing means coupled thereto for receiving and transmitting digital messages, said method for receiving a digital message and ignoring subsequent duplicates of the same digital message communicated between the base station and the mobile stations, said method comprising the steps of:

(a) appending control numbers to successive digital messages transmitted by the base station, wherein different control numbers are appended to different digital messages at the base station;

(b) comparing the control number of a received digital message to the control number of predetermined number of previously received digital messages at a mobile station; and (c) discarding the received digital message if it has the same control number as that of a previously received digital message at the mobile station.

* * * * *

UNITED STATES PATENT AND TRADEMARK OFFICE
CERTIFICATE OF CORRECTION

PATENT NO. : 4,354,252
DATED : 10/12/82
INVENTOR(S) : James Arnold Lamb, Johnny Blankenship, George Dykas
William Milleker, Kenneth Hamilton It is certified that error appears in the above—identified patent and that said Letters Patent is hereby corrected as shown below:

CLAIM 16, line 9, delete "in" and insert --is--

Signed and Sealed this

Eighth Day of March 1983

[SEAL]

Attest:

Attesting Officer

GERALD J. MOSSINGHOFF

Commissioner of Patents and Trademarks